US012037093B2

(12) United States Patent
Power, III

(10) Patent No.: US 12,037,093 B2
(45) Date of Patent: Jul. 16, 2024

(54) SYSTEMS AND METHODS FOR DEPLOYING HYDROELECTRIC ENERGY SYSTEMS

(71) Applicant: OCEANA ENERGY COMPANY, Washington, DC (US)

(72) Inventor: Daniel E. Power, III, Pace, FL (US)

(73) Assignee: OCEANA ENERGY COMPANY, Washington, DC (US)

( * ) Notice: Subject to any disclaimer, the term of this patent is extended or adjusted under 35 U.S.C. 154(b) by 300 days.

(21) Appl. No.: 17/617,404

(22) PCT Filed: Jun. 11, 2020

(86) PCT No.: PCT/US2020/037193
§ 371 (c)(1),
(2) Date: Dec. 8, 2021

(87) PCT Pub. No.: WO2020/252139
PCT Pub. Date: Dec. 17, 2020

(65) Prior Publication Data
US 2022/0242532 A1    Aug. 4, 2022

Related U.S. Application Data

(60) Provisional application No. 62/860,659, filed on Jun. 12, 2019.

(51) Int. Cl.
*B63B 73/30*       (2020.01)
*B60F 3/00*        (2006.01)
(Continued)

(52) U.S. Cl.
CPC ............ *B63B 73/30* (2020.01); *B60F 3/0015* (2013.01); *B60F 3/0061* (2013.01); *B63B 21/50* (2013.01);
(Continued)

(58) Field of Classification Search
None
See application file for complete search history.

(56) References Cited

U.S. PATENT DOCUMENTS

| 2014/0023441 A1* | 1/2014 | Smith | F03B 17/062 |
| | | | 405/224 |
| 2014/0113512 A1* | 4/2014 | Dick | B63B 25/28 |
| | | | 440/12.52 |

(Continued)

FOREIGN PATENT DOCUMENTS

| EP | 2 845 793 A1 | 3/2015 |
| JP | 2013-189862 A | 9/2013 |

(Continued)

OTHER PUBLICATIONS

International Search Report and Written Opinion issued in PCT/US2020/037193, dated Sep. 29, 2020.
(Continued)

*Primary Examiner* — Amelia Vorce
(74) *Attorney, Agent, or Firm* — JONES ROBB, PLLC

(57) ABSTRACT

A method for deploying a payload at a subaquatic deployment location includes submersing a submersible aquatic vehicle in a body of water. The submersible aquatic vehicle carries a payload. The method also includes driving the submersible aquatic vehicle to a deployment location under the body of water while the submersible aquatic vehicle carries the payload in a first position. The method additionally includes at the deployment location, moving the payload from the first position to a second position. The method further includes deploying the payload from the second position to a deployment position at the deployment location.

25 Claims, 39 Drawing Sheets

(51) Int. Cl.
 *B63B 21/50* (2006.01)
 *E02D 27/52* (2006.01)
 *E21B 7/02* (2006.01)
 *E21B 7/124* (2006.01)
(52) U.S. Cl.
 CPC .............. *E02D 27/525* (2013.01); *E21B 7/02* (2013.01); *E21B 7/124* (2013.01)

(56) References Cited

U.S. PATENT DOCUMENTS

| | | | |
|---|---|---|---|
| 2015/0000582 A1* | 1/2015 | Lelaurin | B63B 25/002 |
| | | | 114/257 |
| 2015/0000584 A1* | 1/2015 | Sancoff | B63B 1/14 |
| | | | 114/312 |
| 2018/0009512 A1 | 1/2018 | Dunne et al. | |
| 2018/0079268 A1* | 3/2018 | Sato | B60F 3/00 |
| 2018/0079475 A1* | 3/2018 | Trigui | F16L 1/26 |
| 2018/0162467 A1* | 6/2018 | Correa | B60F 3/0015 |
| 2018/0194446 A1* | 7/2018 | Frühling | B63H 25/42 |
| 2020/0103317 A1* | 4/2020 | Jackson | B63G 8/001 |
| 2020/0110189 A1* | 4/2020 | Fyffe | B63G 8/001 |

FOREIGN PATENT DOCUMENTS

| | | | | |
|---|---|---|---|---|
| JP | 2017-170922 A | 9/2017 | | |
| JP | 2019-059368 A | 4/2019 | | |
| KR | 10-2013-0034644 A | 4/2013 | | |
| WO | 03/046375 A1 | 6/2003 | | |
| WO | WO-2016185039 A1 * | 11/2016 | ............ | B60F 3/0007 |

OTHER PUBLICATIONS

Extended European Search issued in corresponding European Application No. 20821942.8, dated Jun. 21, 2023.

* cited by examiner

SYSTEMS AND METHODS FOR DEPLOYING HYDROELECTRIC ENERGY SYSTEMS

CROSS-REFERENCE TO RELATED APPLICATIONS

This application is a National Stage application of International Patent Application No. PCT/US2020/037193, filed internationally on Jun. 11, 2020, which claims priority to U.S. Provisional Patent Application No. 62/860,659, filed Jun. 12, 2019, the entire contents of each of which is incorporated by reference herein.

TECHNICAL FIELD

The present disclosure relates generally to systems and methods for deploying subaquatic payloads. In particular, the present disclosure relates to systems and methods that utilize submersible aquatic vehicles to deploy hydroelectric energy systems, including, for example, hydroelectric turbines, in a subaquatic environment.

INTRODUCTION

The section headings used herein are for organizational purposes only and are not to be construed as limiting the subject matter described in any way.

Various technologies involve subaquatic systems for which components are delivered to a subaquatic site, such as a river or seabed floor. Such technologies include, among others, subsea mining systems, subsea surveillance systems, subsea battery charging systems, oil drilling technologies, and hydroelectric energy systems.

Regarding hydroelectric energy systems, such systems may utilize a hydroelectric turbine to generate electricity from the current in a moving body of water (e.g., a river or ocean current) or other fluid source. Tidal power, for example, exploits the movement of water caused by tidal currents, or the rise and fall in sea levels due to tides. As the waters rise and then fall, a flow, or fluid current, is generated. The one-directional flow, for example, from a river also creates a current that may be used to generate electricity.

Hydroelectric energy, therefore, may offer an efficient, long-term source of pollution-free electricity, hydrogen production, and/or other useful forms of energy that can help reduce the world's current reliance upon petroleum, natural gas, and coal. Reduced consumption of fossil fuel resources can in turn help to decrease the output of greenhouse gases into the world's atmosphere.

Electricity generation using hydroelectric turbines (which convert energy from fluid currents) is generally known and can have a variety of forms. Such turbines can act like underwater windmills and have a relatively low cost and ecological impact. In various hydroelectric turbines, for example, fluid flow interacts with blades that rotate about an axis and that rotation is harnessed to thereby produce electricity or other forms of energy.

Although recent developments in hydroelectric energy and turbine technology have reduced the building and maintenance costs of such systems, the costs associated with deployment of the turbines and the foundation structures, or spires, used to support the turbines can be relatively high, which in turn can skew the Levelized Cost of Electricity (LCOE) from such turbines. Consequently, the relatively high total system LCOE of hydroelectric turbines can make their use less feasible than other traditional, less expensive power sources (i.e., power sources that may have a lower total system LCOE), such as, petroleum, natural gas, and coal systems.

There exists a need therefore to provide systems and methods for deploying subaquatic payloads that are used in subaquatic technologies. For example, there exists a need to deploying payloads for hydroelectric energy systems, including both hydroelectric turbines, the foundation structures for supporting such turbines, and other component parts of such systems, that lowers the total system LCOE generated. While the use of floating vessels can be used to bring payloads for such subaquatic systems to a remote site and lower the payloads to the desired depth, it may be desirable to provide systems and methods that are able to efficiently move payloads directly from the land to a subaquatic bed. There exists a need to provide systems and methods that can provide flexibility in the deployment of subaquatic payloads, such as hydroelectric energy systems, including the ability to deploy such systems directly from land rather than a water surface (e.g., the sea surface), which can eliminate the need to use water vessels for such deployment.

SUMMARY

Exemplary embodiments of the present disclosure may demonstrate one or more of the above-mentioned desirable features. Other features and/or advantages may become apparent from the description that follows.

In accordance with various exemplary embodiments, a method for deploying a payload at a subaquatic deployment location includes submersing a submersible aquatic vehicle in a body of water. The submersible aquatic vehicle carries a payload. The method also includes driving the submersible aquatic vehicle to a deployment location under the body of water while the submersible aquatic vehicle carries the payload in a first position. The method additionally includes at the deployment location, moving the payload from the first position to a second position. The method further includes deploying the payload from the second position to a deployment position at the deployment location.

In accordance with various additional exemplary embodiments, a system for deployment of a payload at a subaquatic location includes a submersible aquatic vehicle configured to drive to a deployment location at a bed under a body of water. The system also includes at least one payload mounting device affixed to the submersible aquatic vehicle. The payload mounting device is configured to transition between a first position to carry the payload to the deployment location, and a second position to orient the payload for deployment at the deployment location.

Additional objects and advantages will be set forth in part in the description which follows, and in part will be obvious from the description, or may be learned by practice of the present teachings. At least some of the objects and advantages of the present disclosure may be realized and attained by means of the elements and combinations particularly pointed out in the appended claims.

It is to be understood that both the foregoing general description and the following detailed description are exemplary and explanatory only and are not restrictive of the present disclosure and claims, including equivalents. It should be understood the present disclosure and claims, in their broadest sense, could be practiced without having one or more features of these exemplary aspects and embodiments. For example, it is to be understood that, the following detailed description related to the deployment of a hydroelectric turbine and other components of hydroelectric energy systems is exemplary only, and that the disclosed systems and methods can be utilized to carry and deploy various other subaquatic payloads, as would be understood by those of ordinary skill in the art.

BRIEF DESCRIPTION OF THE DRAWINGS

The accompanying drawings, which are incorporated in and constitute a part of this specification, illustrate some exemplary embodiments of the present disclosure and together with the description, serve to explain certain principles. In the drawings

DESCRIPTION OF EXEMPLARY EMBODIMENTS

Figure 1:
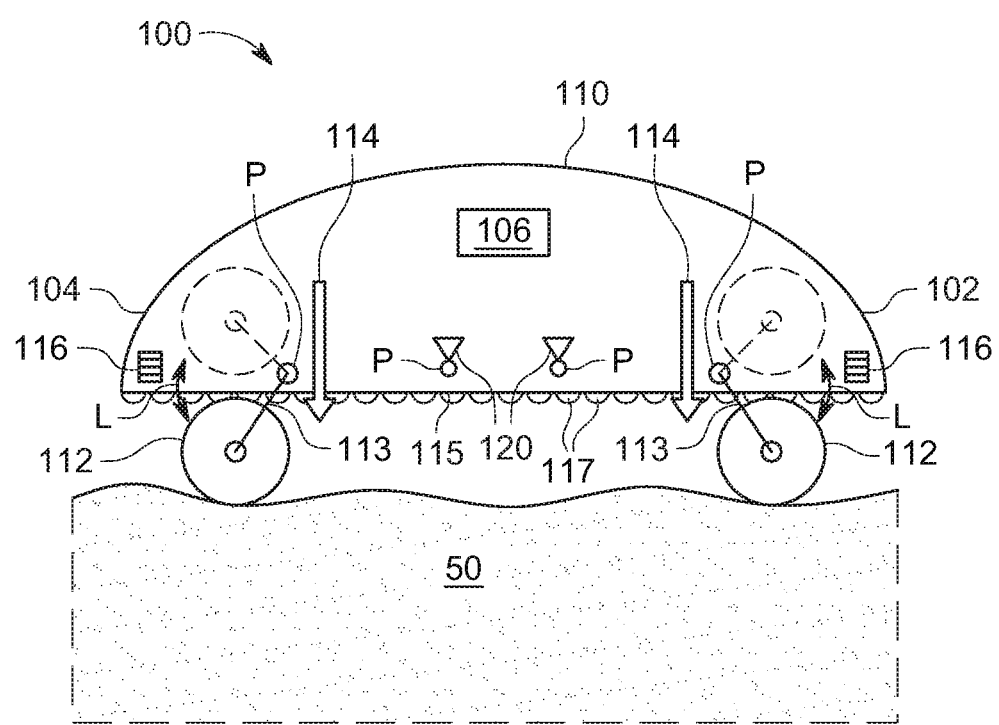
FIG. 1 is a side view of an exemplary embodiment of a system for deploying hydroelectric energy systems in accordance with the present disclosure.

To more efficiently deploy subaquatic payloads, such as, for example, those associated with hydroelectric energy systems, the systems and methods of the present disclosure may utilize submersible aquatic vehicles that can carry and deploy a variety of payloads, such as foundation structures and hydroelectric turbines for hydroelectric energy systems, by submersing the vehicle and driving to a deployment subaquatic site directly from shore or after being lowered from a watercraft (e.g., a floating vessel).

The present disclosure contemplates, for example, systems and methods for deploying hydroelectric energy systems that include a hydroelectric turbine that is configured to generate electricity from the current in a moving body of water (e.g., a river or ocean current) or other fluid source. In accordance with various embodiments of the present disclosure, for example, such hydroelectric turbines may comprise a stationary member (e.g., a stator) and a rotating member (e.g., a rotor) that is disposed radially outward of an outer circumferential surface of the stator (e.g., is concentrically disposed around the stator) and configured to rotate around the stator about an axis of rotation. Such turbines may, for example, have a plurality of blade portions extending both radially inward and radially outward with respect to the rotor. In this manner, the turbines must be positioned in a fluid body, such that a fluid flow having a directional component flow generally parallel to the axis of rotation of the rotor may act on the blade portions to cause the rotor to rotate about the axis of rotation. Examples of such turbines are described, for example, in U.S. Pat. No. 7,453,166 B2, entitled "System for Generating Electricity from Fluid Currents;" U.S. Pat. No. 9,359,991 B2, entitled "Energy Conversion Systems and Methods;" U.S. Pat. No. 10,389,209 B2, entitled "Hydroelectric Turbines, Anchoring Structures, and Related Methods of Assembly," U.S. Pat. No. 10,544,775 B2, entitled "Hydroelectric Energy Systems, and Related Components and Methods;" International Patent Application No. PCT/US19/34306, entitled "Hydroelectric Energy Systems and Methods;" and;" International Patent Application No. PCT/US19/64873, entitled "Orbital Magnetic Gears and Related Systems," the contents each of which is incorporated by reference in its entirety herein.

The above-referenced examples of hydroelectric energy systems and their associated components are non-limiting however, and the present systems and methods can be used with various types and configurations of hydroelectric energy systems and their associated component parts that need to be delivered to subaquatic sites. Furthermore, the present disclosure contemplates utilizing the disclosed systems and methods for deploying various types and configurations of subaquatic payloads and is not intended to be limited to the exemplary hydroelectric energy systems discussed in detail herein.

Various embodiments of the present disclosure contemplate utilizing a submersible aquatic vehicle that can be driven from a deployment location under a body of water, for example, between a site on land, such as an assembly site of the hydroelectric energy system, to a subaquatic deployment site of the system in a fluid body (e.g., under at a bed of a river or sea). Deployment can include both installation of a foundation structure for a hydroelectric turbine, such as, for example, and deployment of the turbine and associated components of the hydroelectric energy system on the foundation structure such that the fluid flow may act on the blades of the turbine. Such submersible aquatic vehicles can additionally be used for retrieving deployed payloads, such as, for example, hydroelectric energy systems from the subaquatic deployment site and bringing them back to land, for example, for repair and/or maintenance of the systems, as will be understood by those of ordinary skill in the art.

In accordance with one or more exemplary embodiments of the present disclosure, systems and methods of deploying hydroelectric energy systems (including, e.g., a foundation structure and a hydroelectric turbine) may utilize an autonomous submersible aquatic vehicle that may be programmed (e.g., with global positioning system (GPS) coordinates) to automatically drive between a first, assembly location and a second, deployment location. The autonomous nature of the submersible aquatic vehicle may, for example, allow the vehicle to make trips to and from the deployment location, while allowing the operation to be monitored from shore such that a vehicle operator is not required to make the trip back and forth between the assembly location and the deployment location. This may additionally help with the safety of the deployment, as a deployment crew is not required to physically be at the deployment location.

To become more streamlined, in accordance with various embodiments of the present disclosure, a submersible aquatic vehicle can transition between a first, driving configuration and a second, deployment configuration. Upon completion of a designated task at the second, deployment location, the vehicle may then transition back from the second, deployment position to the first, driving configuration and drive back to the first, assembly location. Such transitioning may occur automatically in the case of an autonomous vehicle being programmed to detect its location and completion of various tasks and/or through the use of wireless control systems that can be used by an operator on the shore to manually place the vehicle into the various configurations and operational modes. Accordingly, it is contemplated that the submersible aquatic vehicles of the present disclosure may employ remote controlled robotic technology to permit operator input remotely to control various movements of the submersible aquatic vehicle.

A submersible aquatic vehicles in accordance with various embodiments of the present disclosure may drive back and forth between the first and second locations (e.g., between the assembly site and the deployment site) to bring the various components of the hydroelectric energy system (e.g., the foundation structure/spire and the hydroelectric turbine) to the deployment site for installation, and complete various tasks at the deployment site to facilitate deployment of the hydroelectric energy system. In various embodiments, for example, the submersible aquatic vehicle may make only one round trip (i.e., back and forth) between the first and second locations. For example, the vehicle may deploy a fully assembled hydroelectric energy system (e.g., hydroelectric turbine and foundation structure) into a pre-drilled hole at the deployment site. In this scenario, the hole may be drilled prior to the vehicle's arrival at the deployment site by, for example, a deep sea drilling rig, or another subaquatic boring machine as known by those of ordinary skill in the art. In various additional embodiments, the submersible aquatic vehicle may make two round trips between the first and second locations. In a first trip, for example, the vehicle may itself employ a boring mechanism to drill a hole in the ground at the deployment site (e.g., the vehicle may carry a boring mechanism back and forth between the first and second locations). While in a second trip, the aquatic autonomous vehicle may: 1) carry the assembled hydroelectric energy system (e.g., foundation structure/spire and hydroelectric turbine) to the deployment site, and 2) install the hydroelectric energy system into the hole. Various additional embodiments also contemplate that the autonomous vehicle may assemble the components of the hydroelectric energy system (e.g., place the turbine on top of the foundation structure) at the deployment site. In various further exemplary embodiments, the vehicle may make three round trips, splitting the installation of the foundation structure/spire and hydroelectric turbine into two different trips.

In an alternative embodiment, the submersible aquatic vehicle may be equipped and configured to carry drilling equipment and the hydroelectric energy system payload for deployment. In this case, the submersible aquatic vehicle may have a drilling configuration and a deployment configuration, and be transitionable between the two.

Those of ordinary skill in the art will understand, however, that the disclosed systems and methods contemplate utilizing the submersible autonomous vehicle to make any number of trips required to fully deploy a functioning hydroelectric energy system at the deployment site.

Accordingly, embodiments of the present disclosure contemplate systems and methods for deploying hydroelectric energy systems that may efficiently deploy hydroelectric energy systems directly from land rather than a water surface (e.g., the sea surface), thereby eliminating the need to employ costly vessels for turbine deployment.

With reference now to FIGS. 1-6, 10-18, and 19-42, exemplary embodiments of a system 100, 200, 300, 400, 500, 600, 700 for deploying a hydroelectric energy system in accordance with the present disclosure are shown. The system 100, 200, 300, 400, 500, 600, 700 includes a submersible aquatic vehicle 110, 210, 310, 410, 510, 610, 710 such as, for example, a vehicle having a configuration similar to those used in underwater excavation. The system 100, 200, 300, 400, 500, 600, 700 also includes at least one support 120, 320, 420, 520, 620, 720 affixed, for example, to an outside surface of the submersible aquatic vehicle 110, 210, 310, 410, 510, 610, 710 and/or configured to telescope outward from a housing within the submersible aquatic vehicle. Two supports are shown in the embodiment of FIGS. 1-6, while only one support is shown in the embodiments of FIGS. 19-42, but such number is exemplary only and other numbers, arrangements, and/or configurations of supports are contemplated.

Figure 43:
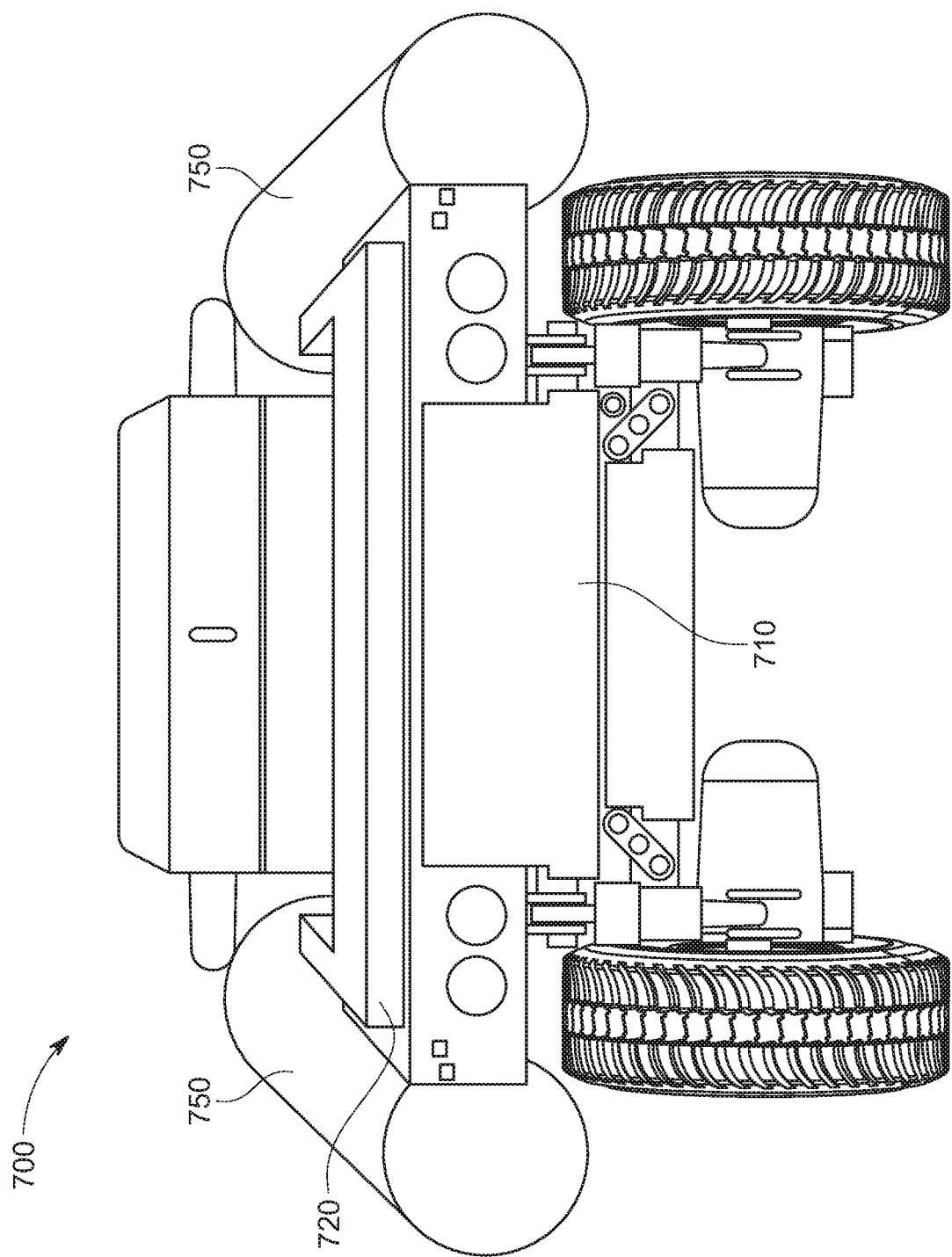
FIG. 43 shows a front view of yet another exemplary embodiment of a system for deploying hydroelectric energy systems with ballast tanks in accordance with the present disclosure.

In accordance with various embodiments, a submersible aquatic vehicle 110, 210, 310, 410, 510, 610, is configured to drive between a first, assembly location and a second, deployment location. As illustrated, for example, in FIG. 9, in accordance with various embodiments, the submersible aquatic vehicle 110, 210, 310, 410, 510, 610, (the submersible aquatic vehicle 110 being shown for exemplary purposes in FIG. 9) is configured to drive back and forth between a hydroelectric turbine assembly site 10 on land and a hydroelectric turbine deployment site 20 under water. Various embodiments of the present disclosure also contemplate that a watercraft (e.g., a boat or other floating vessel) may be used to transport the submersible aquatic vehicle closer to the deployment site 20, for example, to avoid obstructions or other impasses in the seafloor along the vehicle's route between the assembly site 10 and the deployment site 20. For example, a submersible aquatic vehicle, such as, for example, a submersible aquatic vehicle 710 (see FIG. 43) comprising ballast tanks 750 may be loaded onto a watercraft at the assembly site 10 and transported closer to the deployment site 20, where it is then dropped into the water from the watercraft. As would be understood by those of ordinary skill in the art, the ballast tanks 750 shown on either side of the vehicle 710 may be used to float the aquatic vehicle 710 in the water, and then filled (e.g., with water or other fluid that is pumped into the ballast tanks 750) to submerge the submersible aquatic vehicle 710. If required, the submersible aquatic vehicle 710 may then drive the remaining distance to the deployment site 20. Those of ordinary skill in the art will understand that the vehicle 710 illustrated in FIG. 43 is exemplary only, and that the systems of the present disclosure contemplate using various types and configurations of ballast systems, as required for the conditions of an intended application.

Figure 37:
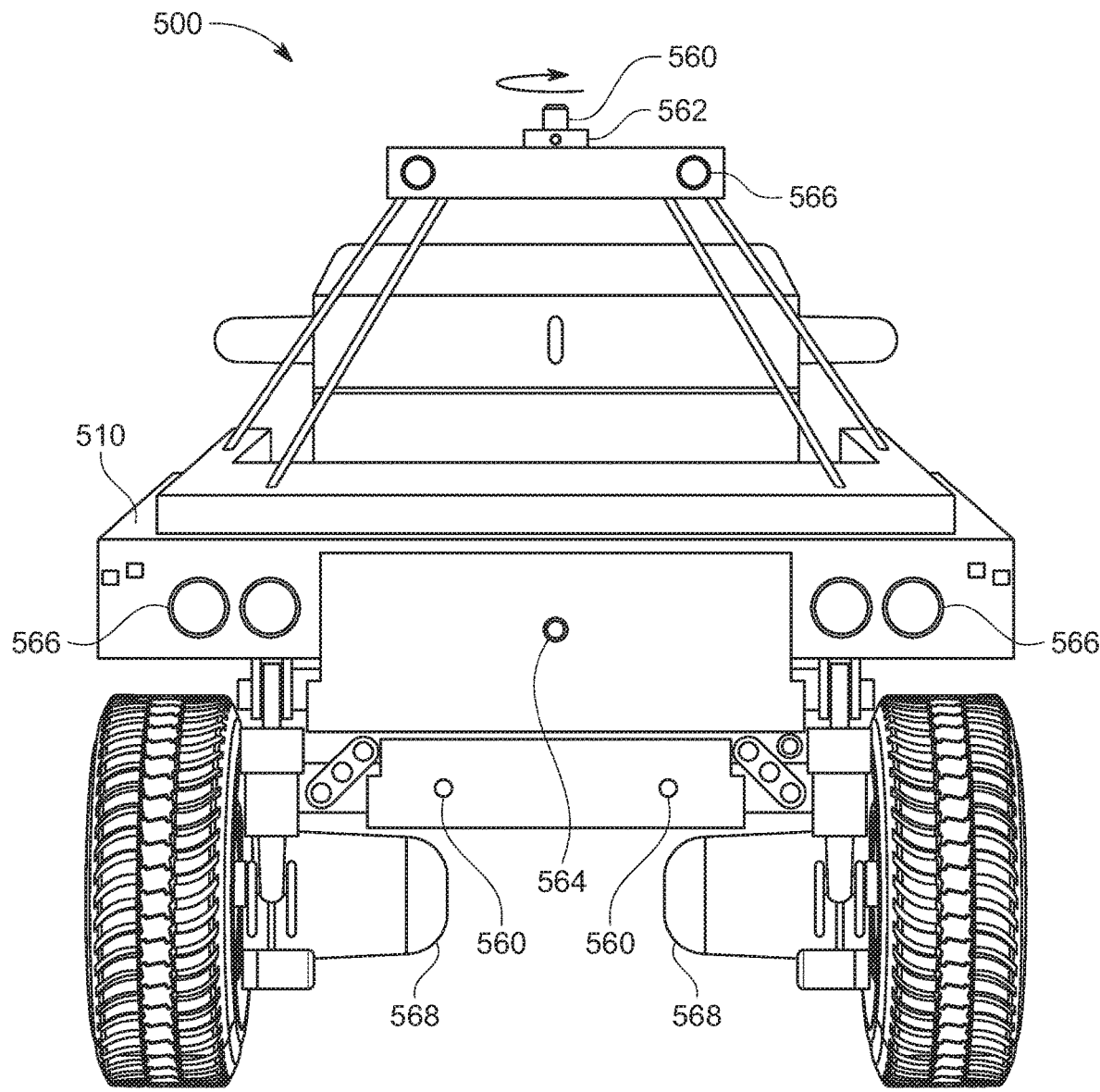
FIG. 37 shows a front view of the system for deploying hydroelectric energy systems of FIGS. 27-34 illustrating exemplary autonomous vehicle components in accordance with the present disclosure.
Figure 38:
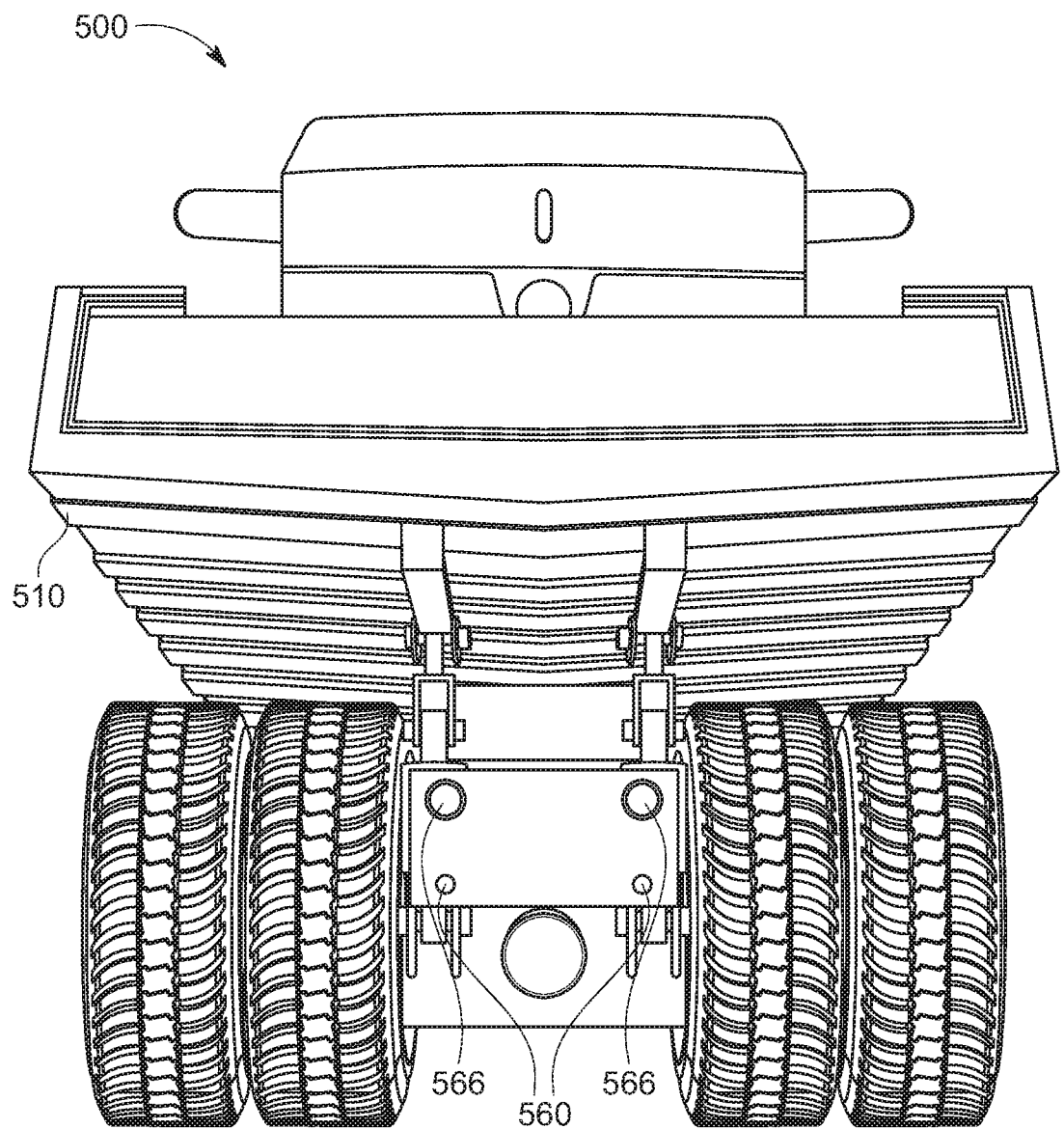
FIG. 38 shows a back view of the system for deploying hydroelectric energy systems of FIG. 37.
Figure 39:
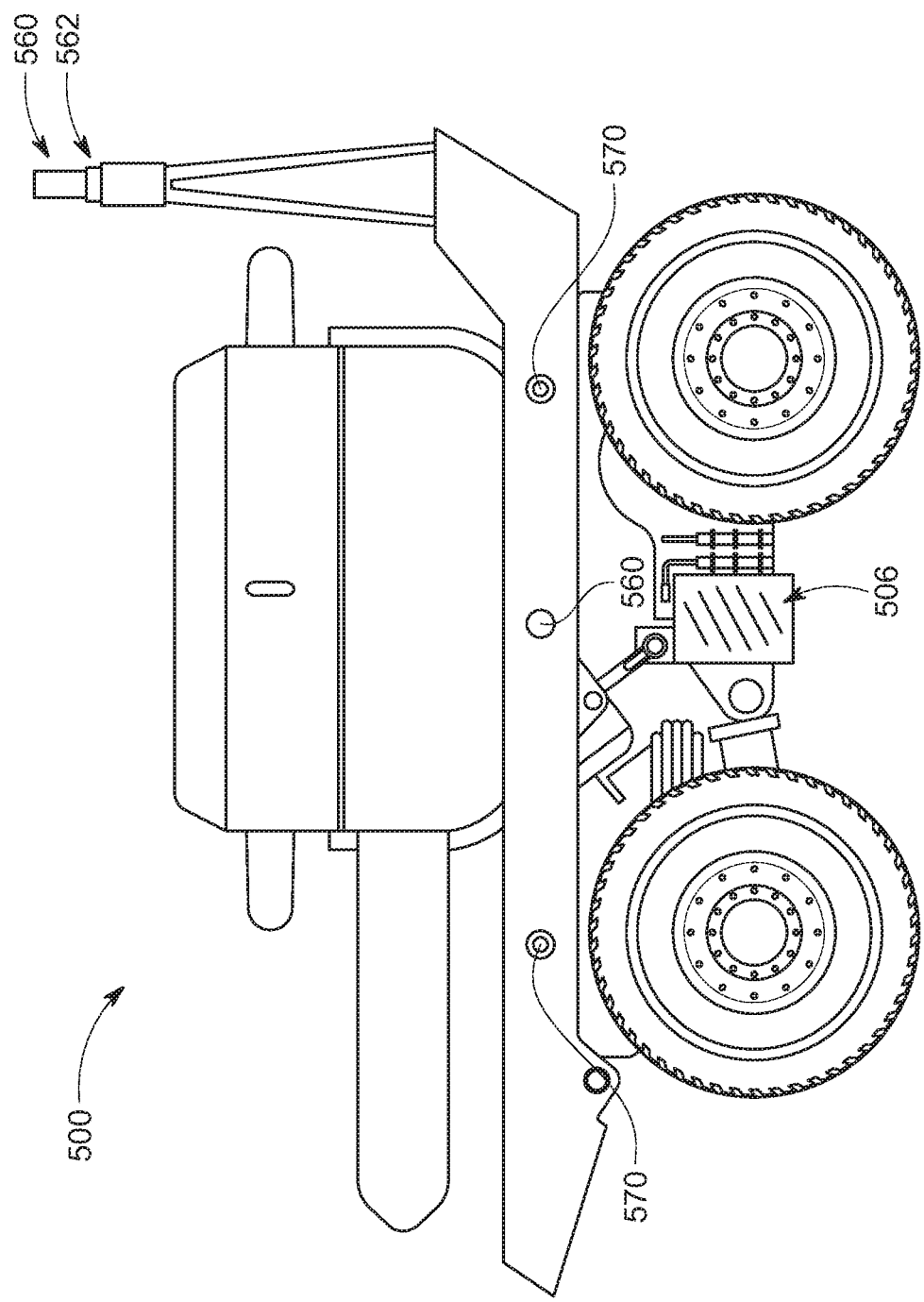
FIG. 39 shows a side view of the system for deploying hydroelectric energy systems of FIG. 37.

In various embodiments, for example, the submersible aquatic vehicle 110, 210, 310, 410, 510, 610, 710 is autonomous and may not require the use of an operator to drive the vehicle and make the trips back and forth to and from the subaquatic site. For example, the submersible aquatic vehicle can be programmed to automatically drive back and forth between the assembly site 10 and the deployment site 20, or to the deployment site 20 after being floated and submerged from a watercraft, using, for example, the GPS coordinates of the sites 10 and 20, and/or the watercraft. For example, as illustrated in the embodiments of FIGS. 37-39, a submersible aquatic vehicle 510 may include various autonomous vehicle components as will be understood by those of ordinary skill in the art, including, but not limited to, multiple lidar units 560 and lights 566 positioned around the vehicle 510, a camera 562 and video camera 564 positioned at a first end 501 (i.e., front) of the vehicle 510, sonar sensors 570 positioned along each side of the vehicle 510, and electric motors 568 (e.g., with reduction gears) to drive the vehicle 510 (e.g., configured to drive the wheels and/or track of the vehicle). The aquatic vehicle 510 may also employ an autonomous control and monitoring unit that is configured with two computers: a remote embedded controller 506 (see FIG. 39) located in a pressurized housing in the aquatic vehicle 510 and a host controller 586 located in a control room 580 (see FIG. 40) on shore, in the air, or carried by a watercraft. The remote embedded controller 506 takes charge of data acquisition, vehicle operation (e.g., runs autonomous vehicle software), and telecommunication with the host controller 586 in the control room 580, while the host controller 586 controls and monitors the aquatic vehicle 510. Control room operators may, for example, monitor the aquatic vehicle's operations to ensure that everything is working properly. Although the present disclosure contemplates all levels of vehicle and operational automation (i.e., partial automation, conditional automation, high automation, and full automation) including fully autonomous deployments, it is also contemplated that in certain scenarios that the control room operators may still want to witness the full deployment operation in real time.

The remote embedded controller 506 may include, for example, an electric control unit (ECU) that can store the GPS coordinates and execute programs and functions related to the operation of the system 500 and the submersible aquatic vehicle 510. The controller 506 can include, for example, a storage element such as a disk drive, flash drive, memory circuit, or other memory device. The storage element can store software which can be used in operation of the controller 506 and the autonomous operations of the vehicle 510. Software can include computer programs, firmware, or some other form of machine-readable instructions, including an operating system, utilities, drivers, network interfaces, applications, and the like. The controller 506 can further include a processing element such as a microprocessor or other circuitry to retrieve and execute software from the storage element. The controller 506 can also comprise other components such as a power management unit, a control interface unit, etc.

While the controllers described above are depicted in the exemplary embodiments as single units, those having skill in the art would appreciate that distributed controllers and processors can be used in different subsystems as desired.

Figure 40:
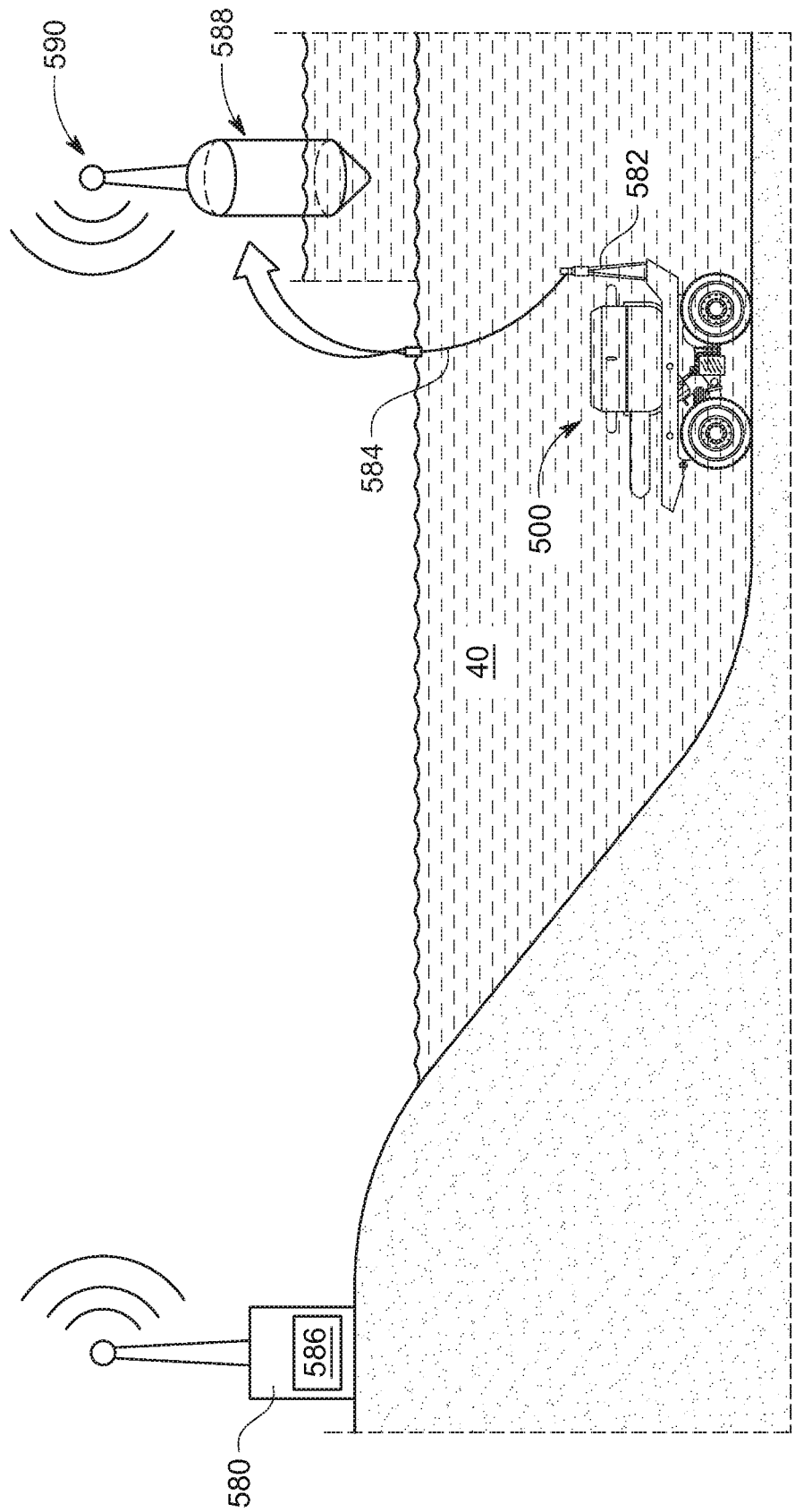
FIG. 40 illustrates an exemplary data link transmission between the system for deploying hydroelectric energy of FIG. 37 and a control room in accordance with the present disclosure.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices To connect the two controllers 506 and 586, in accordance with various embodiments of the contemplated systems for deploying a hydroelectric system, as illustrated in FIG. 40, the aquatic vehicle 510 is equipped with a buoy 588 and an antenna 590. The buoy 588, for example, is attached to the vehicle 510 via a tether 584, which is deployed to the water surface (e.g., sea surface) as the aquatic vehicle 510 moves from the shore into the water (e.g., along the sea floor). As the aquatic vehicle 510 returns to shore, the buoy 588 is then winched back down to the aquatic vehicle 510 via a winch 582. As will be understood by those of ordinary skill in the art, the data link transmission between the two controllers 506 and 586 occurs by means of high frequency radio signals passing through a fiber optic cable (not shown) from the aquatic vehicle 510 on the seafloor to the buoy 588 on the sea surface. The radio signals are then broadcasted from the antenna 590 to the host controller 586. This tethered, recoverable buoy 588 and winch 582 assembly may, for example, be mounted to a front of the aquatic vehicle 510 in a housing, such that the winch 582 is configurable to deploy and retract the buoy 588 from the housing.

Those of ordinary skill in the art would understand that the autonomous aquatic vehicle 510 described above and illustrated in the embodiments of FIGS. 37-39 is exemplary only and that the aquatic vehicles in accordance with the present disclosure may include various types and arrangements of autonomous vehicle components, employ various types and configurations of autonomous control and monitoring units, and utilize various systems and methods to link the aquatic vehicles to, for example, a control room. Those of ordinary skill in the art would further understand that, although the above exemplary aquatic vehicle 510 utilizes GPS coordinates for its autonomous operations, the systems and methods of the present disclosure contemplate using any known methods to autonomously guide the aquatic vehicles back and forth between the assembly site 10 and the deployment site 20. For example, in applications in which the submersible aquatic vehicles are required to drive deeper (i.e., at greater depths under the water) and possibly out of range of satellite signals (which are used in GPS systems), the vehicles may employ a Positioning System for Deep Ocean Navigation (POSYDON). In such embodiments, a set of lightweight passive beacons may be installed near the deployment site 20, such that the aquatic vehicle may triangulate a signal with the beacons to deduce the location of the deployments site 20.

Moreover, in various embodiments, remotely controlled operation of autonomous subaquatic vehicles is contemplated, such that rather than be programmed to automatically begin various operational tasks based on sensing location, etc., operators may utilize remote control input devices wirelessly communicating with the vehicle to transition the vehicle to perform various tasks, akin to robotic control systems technologies.

The various autonomous control systems and parts described above with reference to the exemplary embodiments of FIGS. 37-40 can be implemented with any of the other exemplary embodiments described herein.

Figure 9:
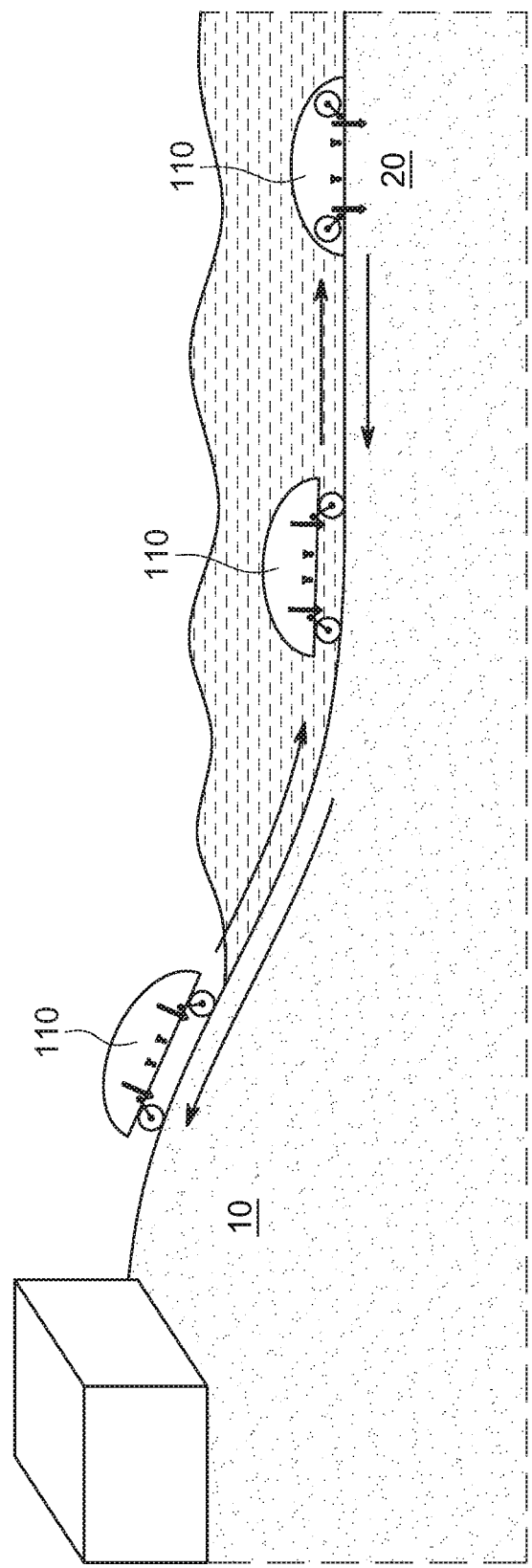
FIG. 9 is a diagram illustrating an exemplary route traversed by a submersible aquatic vehicle of the system of FIG. 1 during deployment of a hydroelectric energy system in accordance with the present disclosure.
Figure 10:
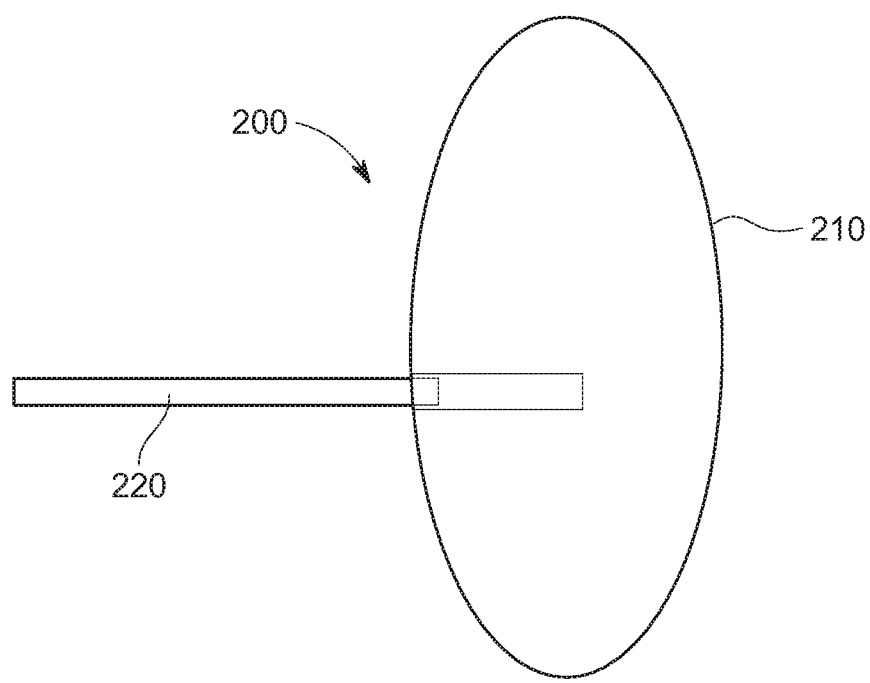
FIG. 10 is a top view of another exemplary embodiment of a system for deploying hydroelectric energy systems in accordance with the present disclosure.
Figure 11:
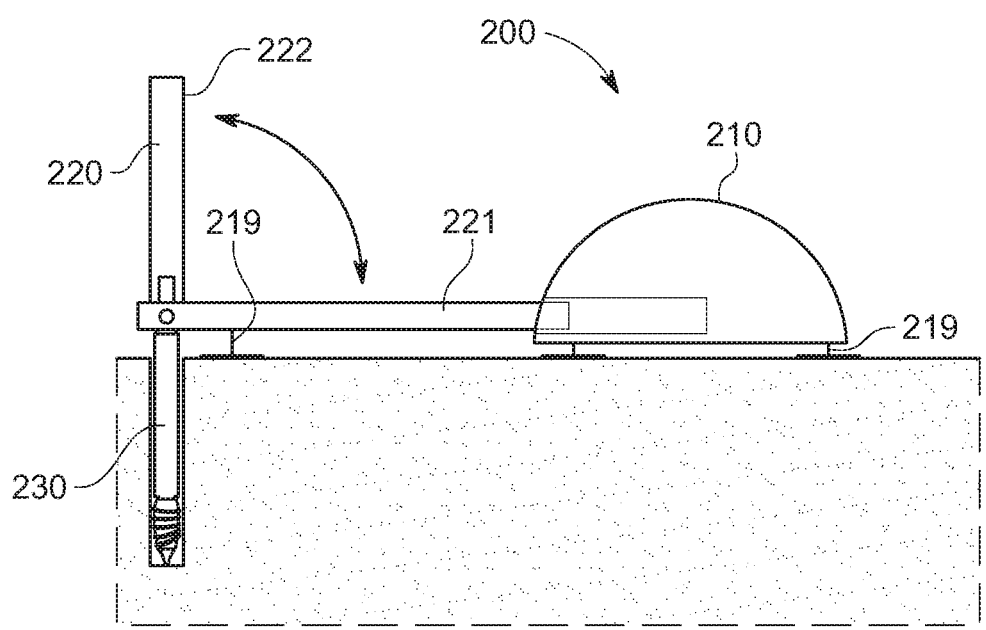
FIG. 11 is a front view of the system for deploying hydroelectric energy systems of FIG. 10, in a second configuration, with a boring mechanism being deployed.
Figure 12:
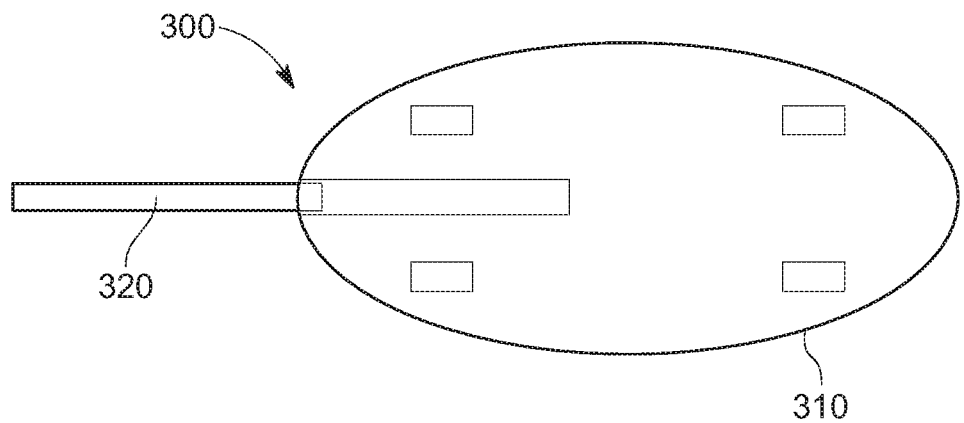
FIG. 12 is a top view of another exemplary embodiment of a system for deploying hydroelectric energy systems in accordance with the present disclosure.
Figure 13:
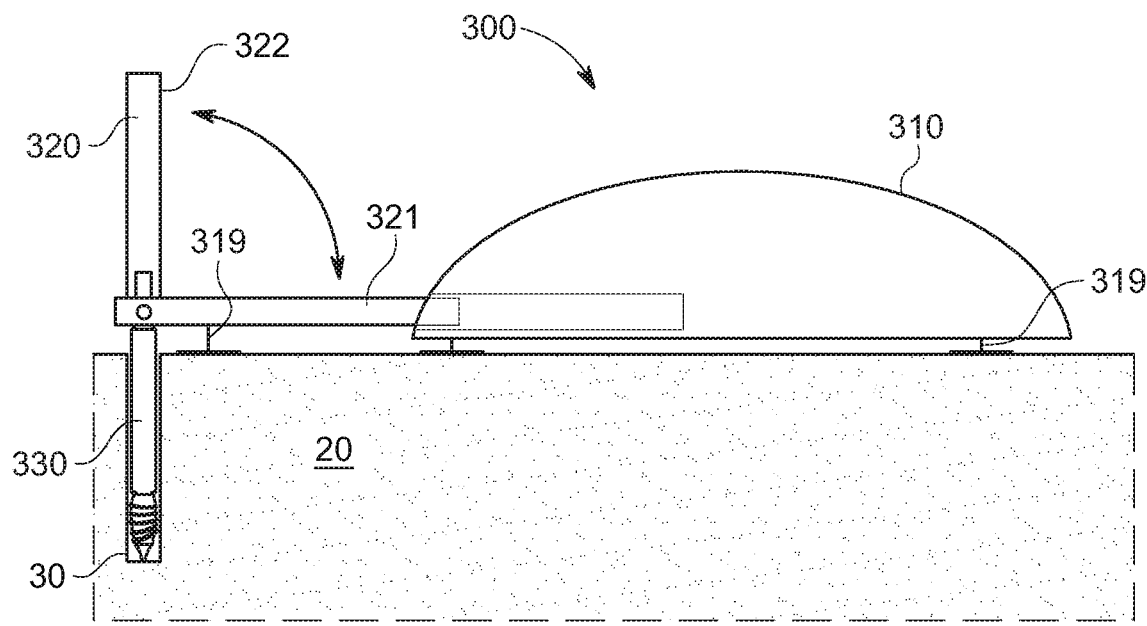
FIG. 13 is a side view of the system for deploying hydroelectric energy systems of FIG. 12, in a second configuration, with a boring mechanism being deployed.
Figure 14:
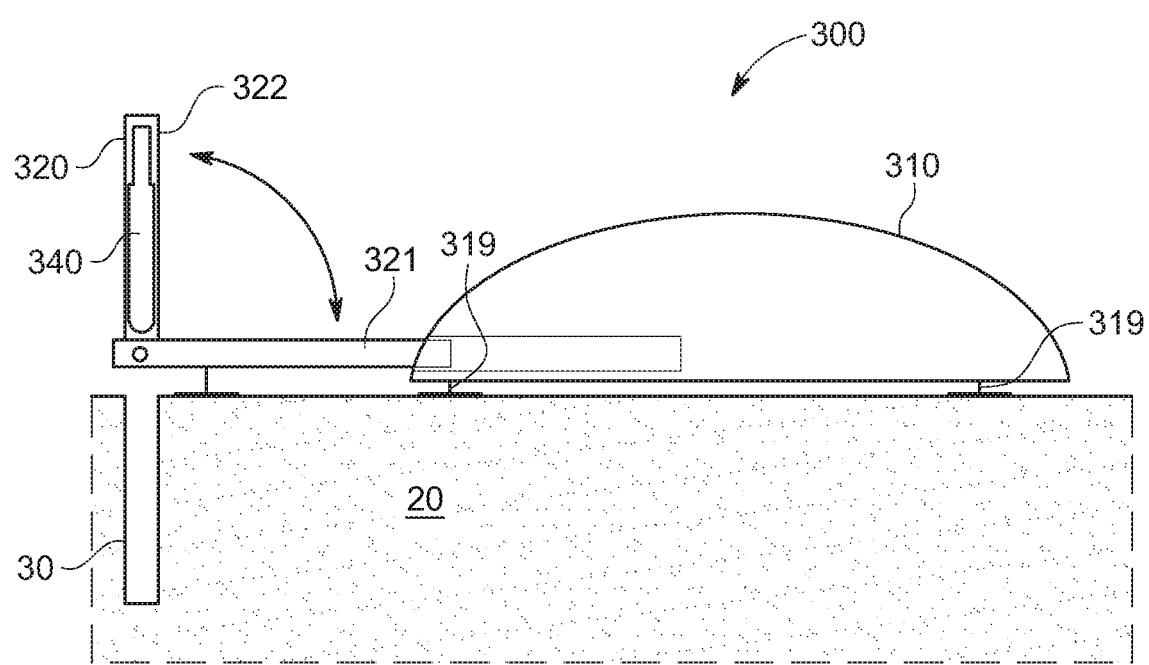
FIG. 14 is a side view of the system for deploying hydroelectric energy systems of FIG. 12, in the second configuration, with a foundation structure being deployed.
Figure 15:
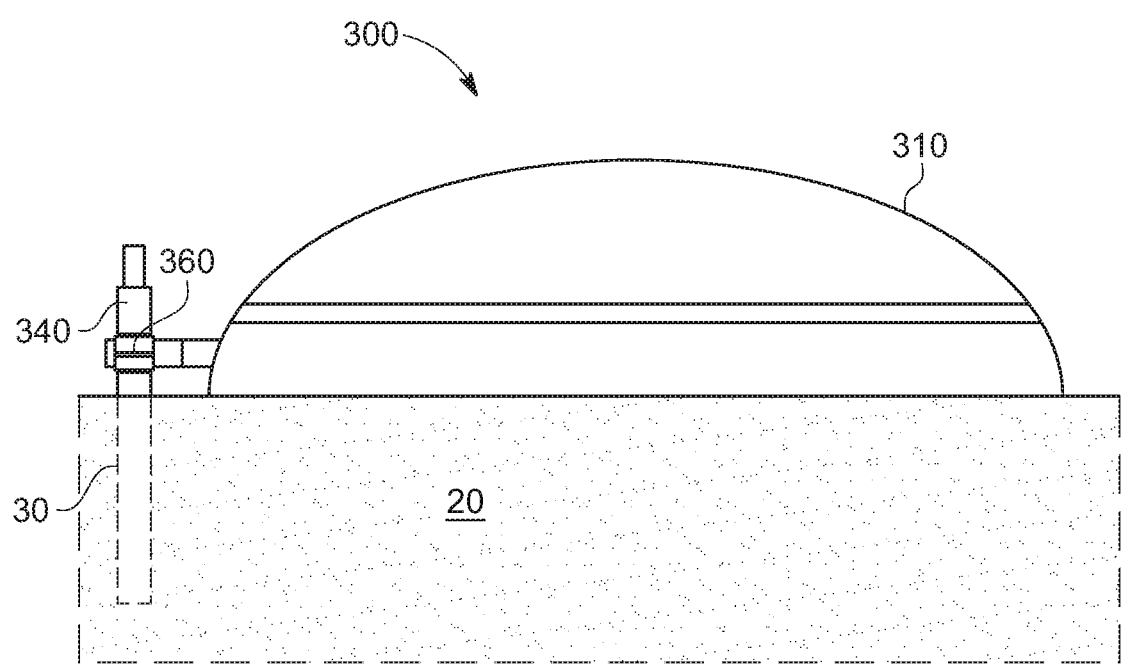
FIGS. 15-18 show side views of the system for deploying hydroelectric energy systems of FIG. 12, in the second configuration, illustrating exemplary steps to deploy a hydroelectric turbine on the foundation structure.
Figure 16:
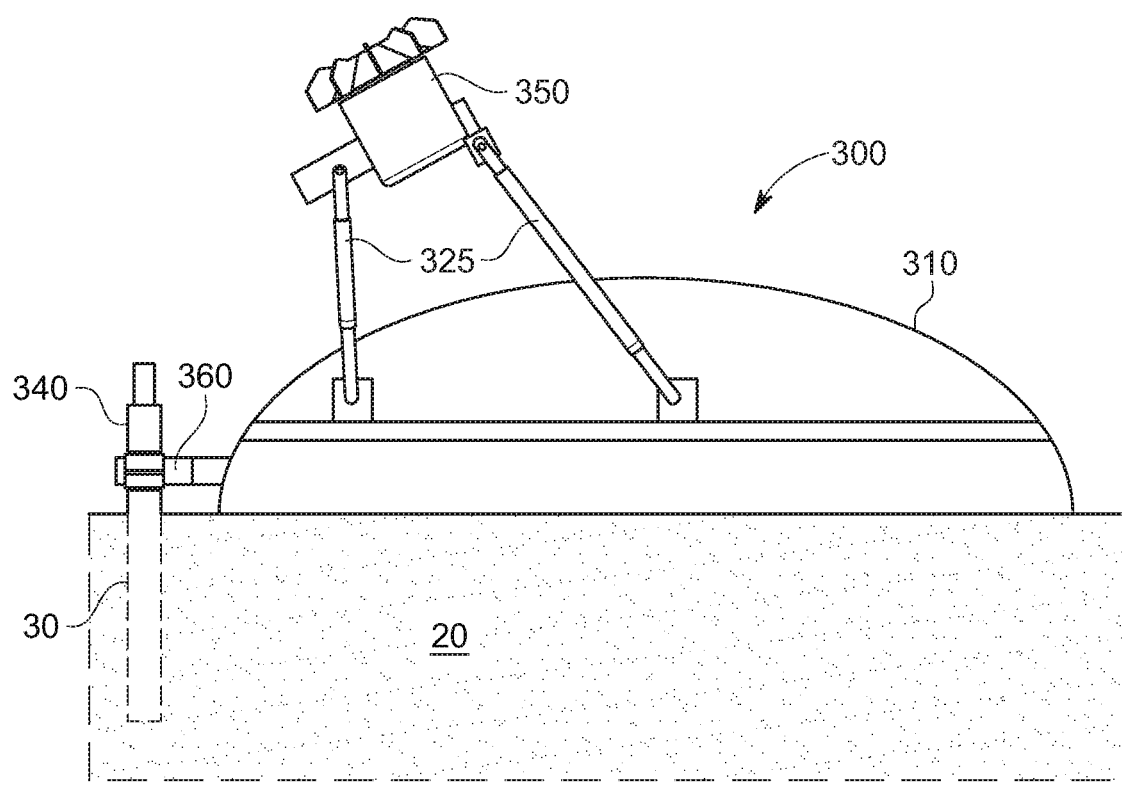
Figure 17:
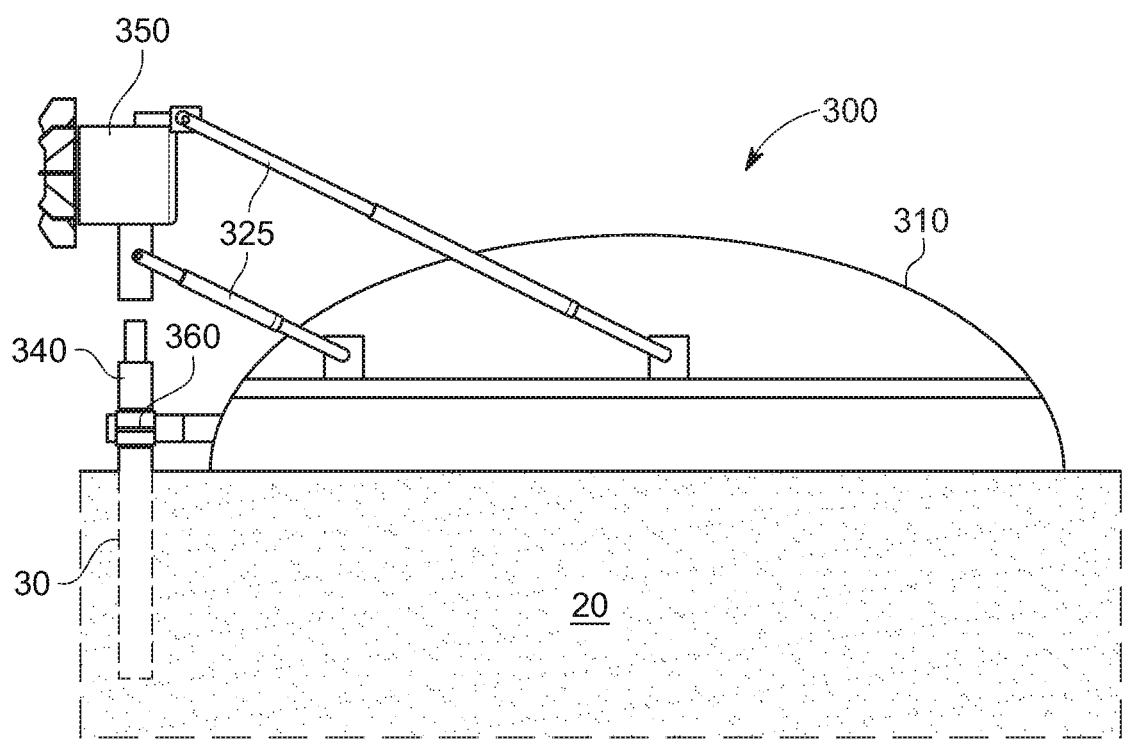
Figure 18:
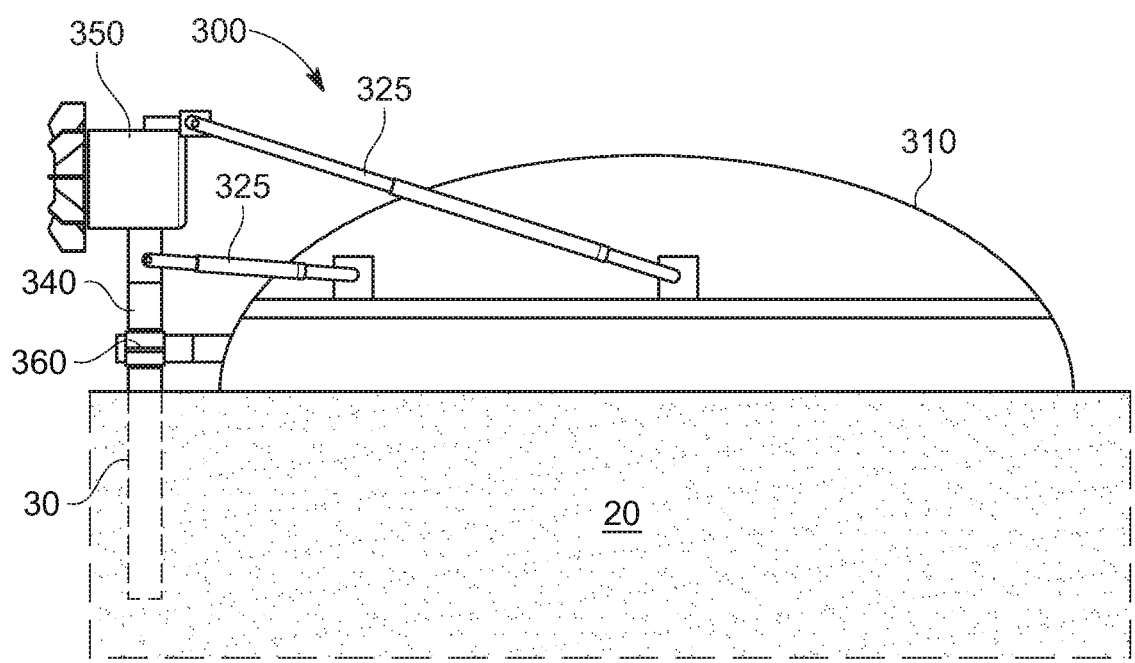
Figure 19:
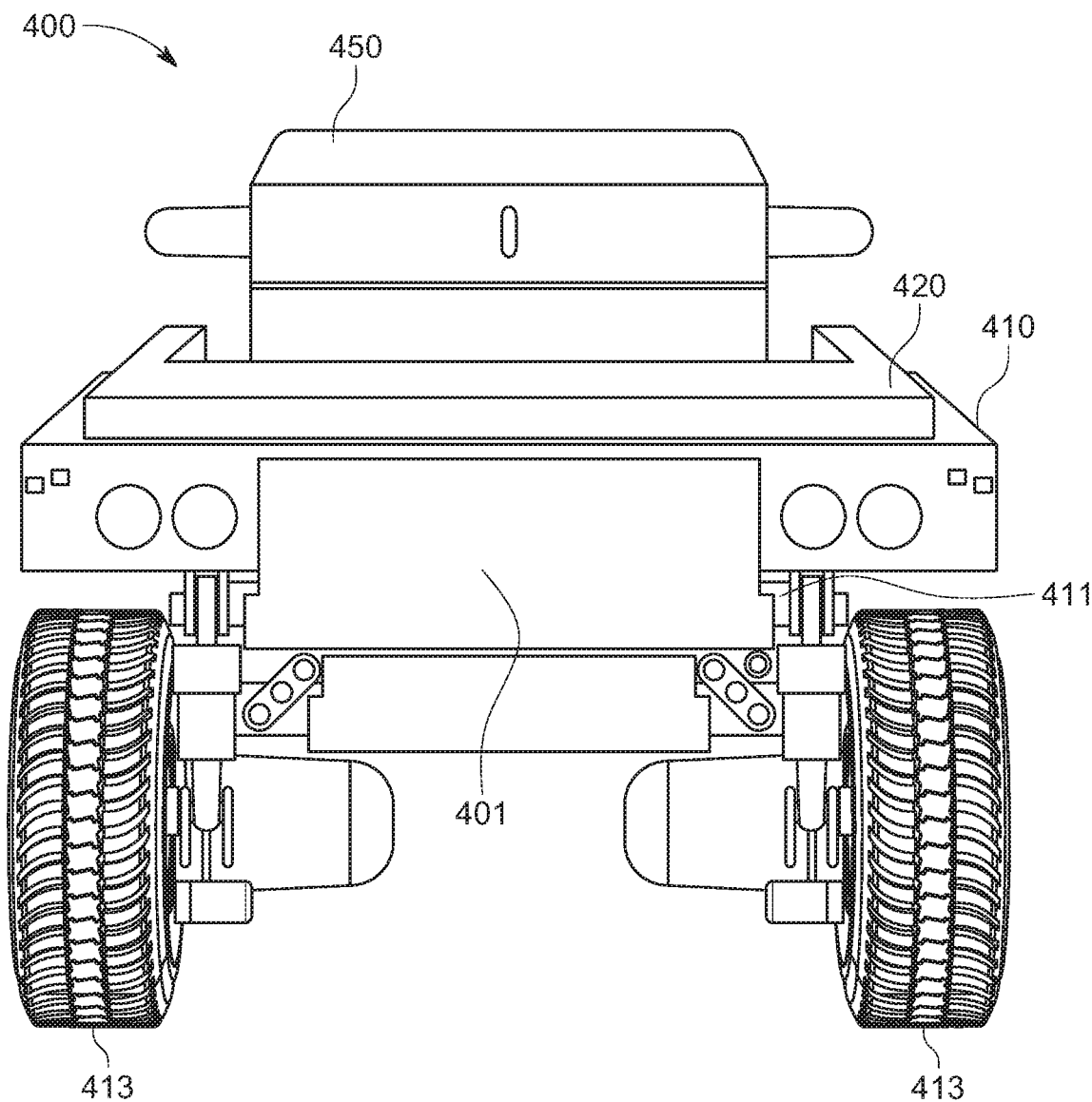
FIG. 19 is a front view of another exemplary embodiment of a system for deploying hydroelectric energy systems in accordance with the present disclosure.
Figure 20:
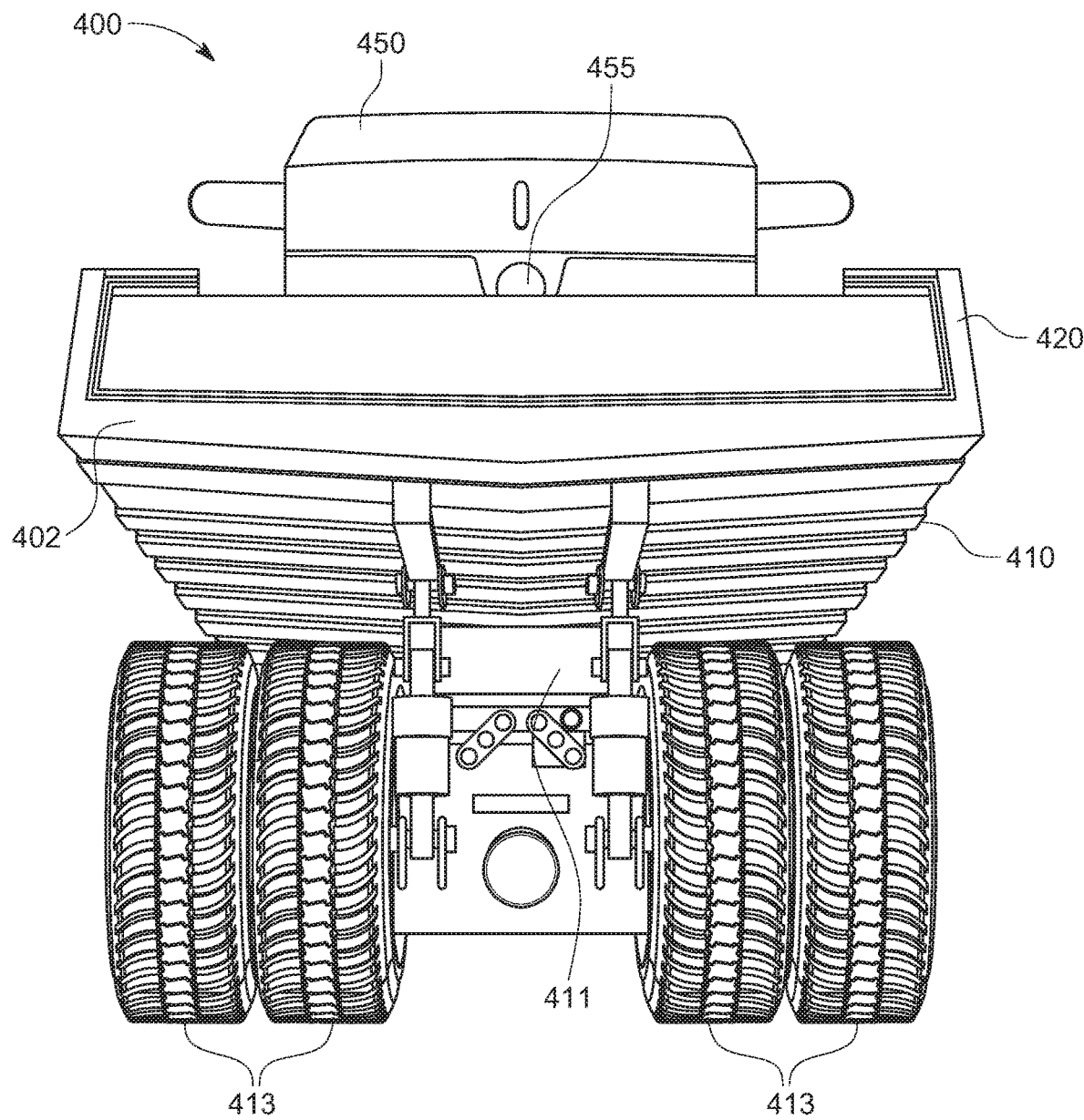
FIG. 20 is a back view of the system for deploying hydroelectric energy systems of FIG. 19.
Figure 21:
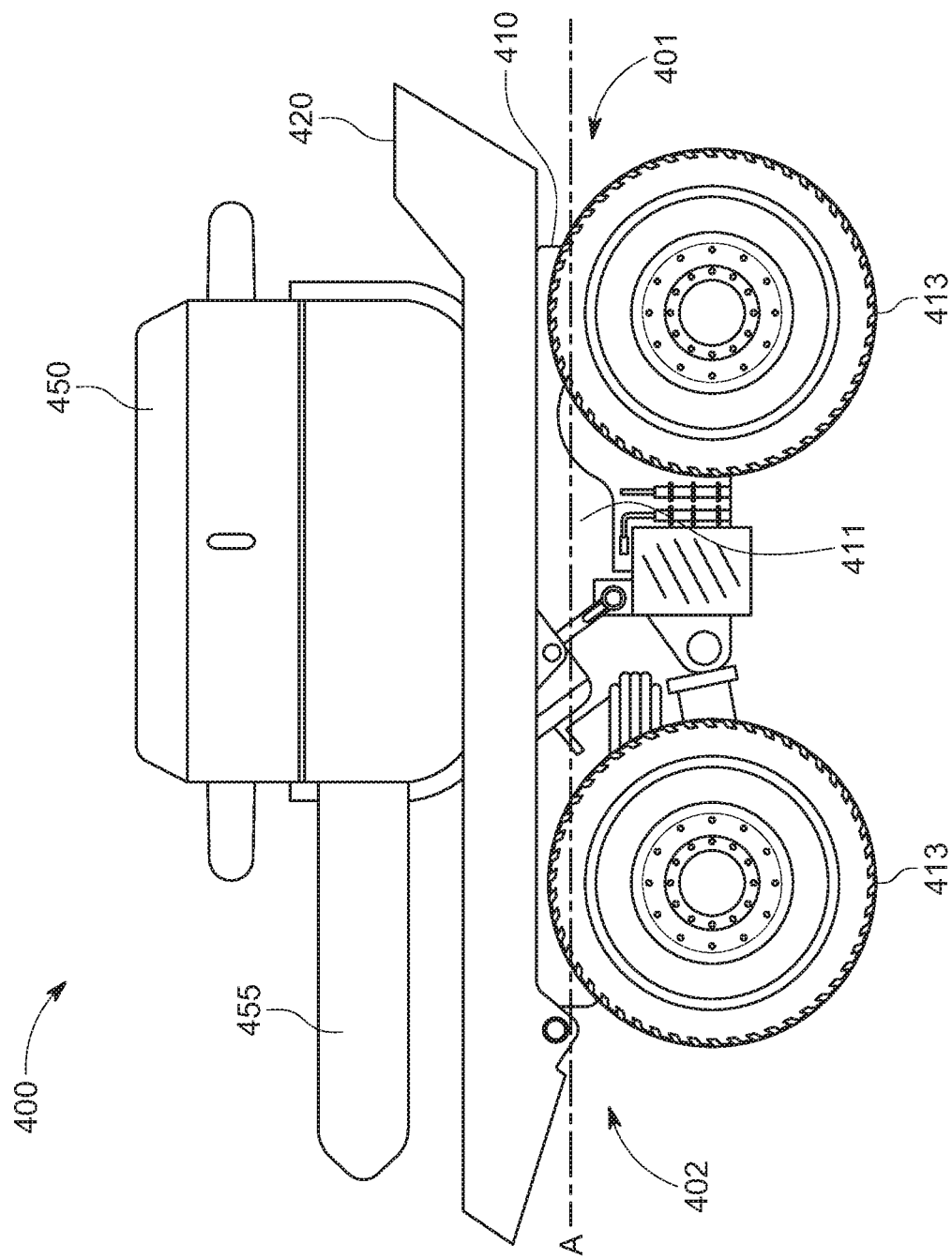
FIG. 21 is a side view of the system for deploying hydroelectric energy systems of FIG. 19.
Figure 22:
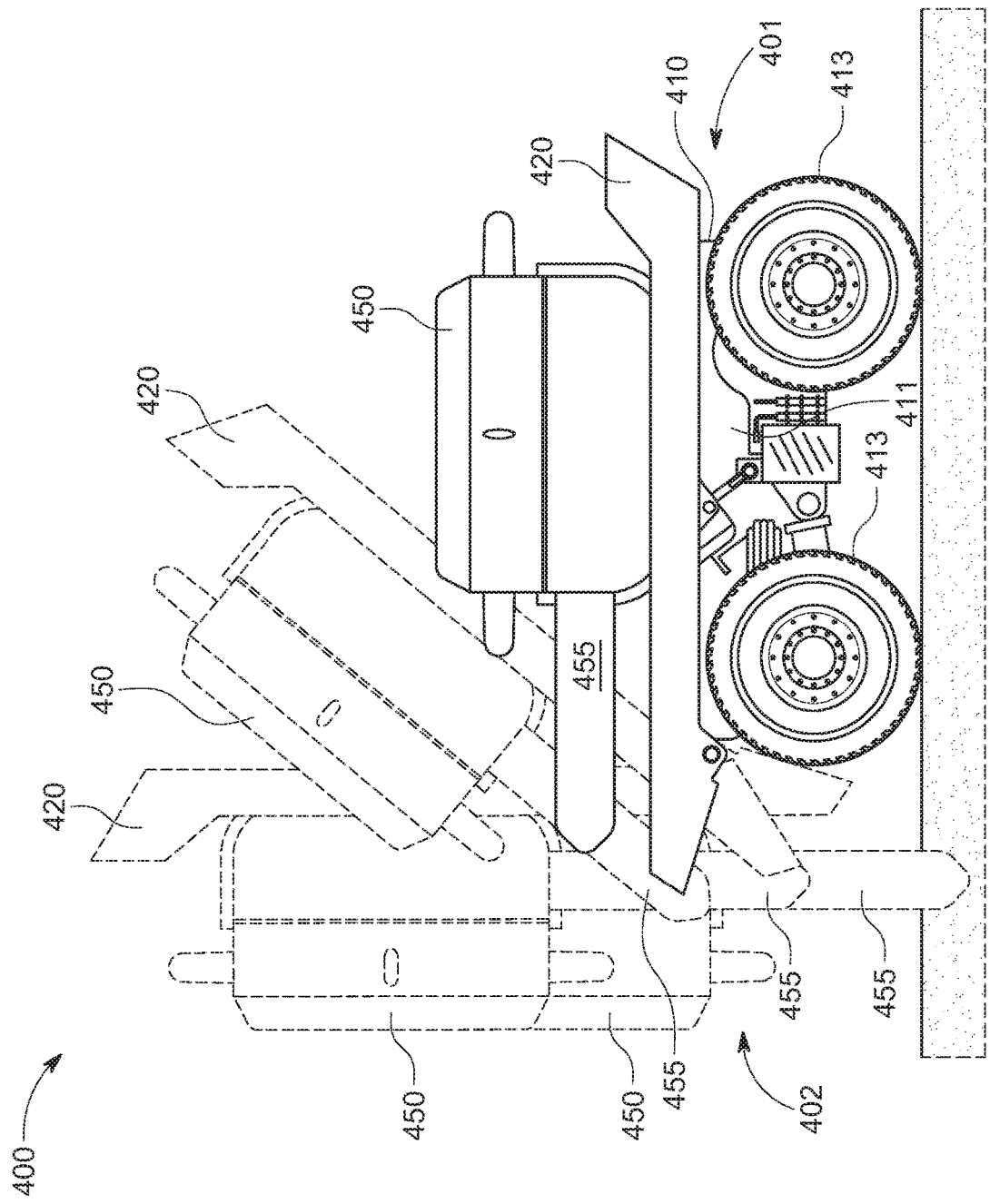
FIG. 22 shows side views of the system for deploying hydroelectric energy systems of FIG. 19 transitioning a support between a first position and a second position to deploy a hydroelectric energy system.

With reference now to the embodiment of FIGS. 1-6, as also illustrated in FIG. 9, in accordance with one exemplary embodiment, a submersible aquatic vehicle 110 is illustrated that is transitionable between a first, driving configuration (see, e.g., the vehicle 110 at the assembly site 10) and a second, deployment configuration (see, e.g., the vehicle 110 at the deployment site 20). In this manner, the submersible aquatic vehicle 110 may be configured to transition between a first configuration that is suitable for driving to and from the deployment site 20 and a second configuration that is suitable for maintaining a stable position at the deployment site 20. For example, when a hydroelectric energy system is being deployed at a site 20 with tidal currents, the submersible aquatic vehicle 110 may transition into a configuration that may better withstand the thrust forces exerted by the tidal currents, which may, for example, reach a thrust speed in a range of up to about 3.5 meters/second. This may permit a submersible aquatic vehicle 110 to be made relatively lightweight and of compact design, while still allowing for a stable configuration that allows it to withstand forces associated with current in a subaquatic environment.

Figure 2:
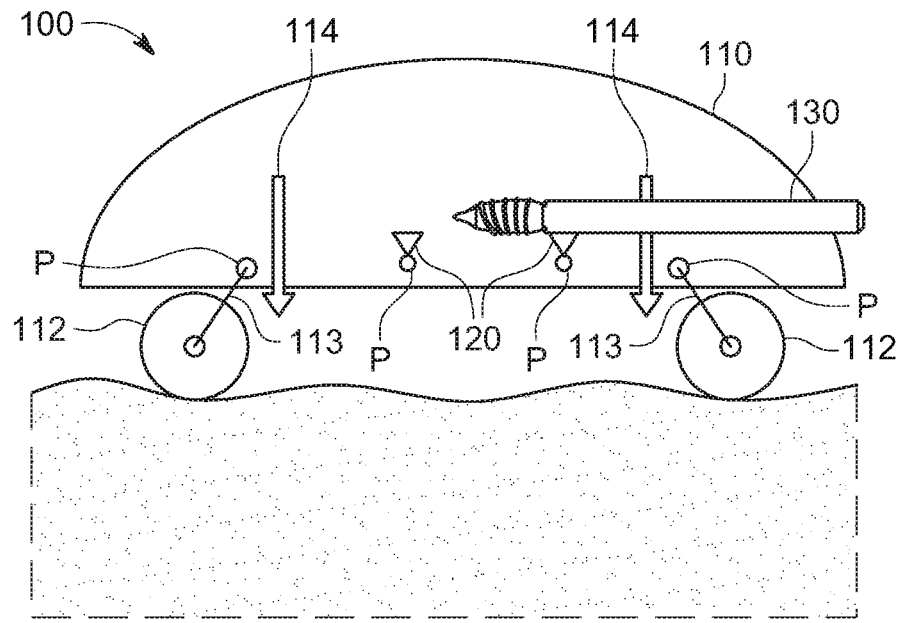
FIG. 2 is a side view of the system for deploying hydroelectric energy systems of FIG. 1, in a first configuration, with a boring mechanism in accordance with the present disclosure.
Figure 3:
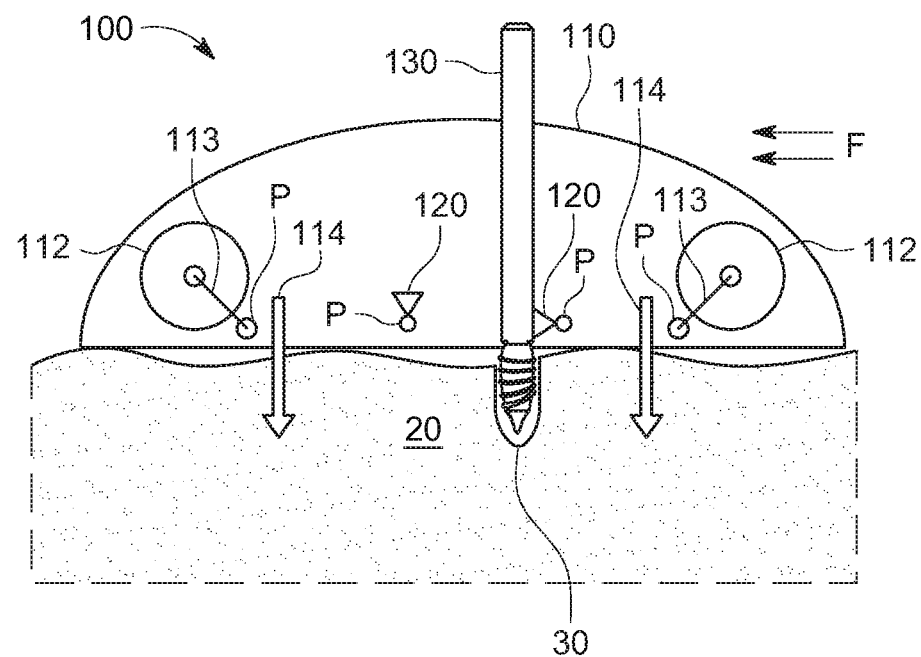
FIG. 3 is a side view of the system for deploying hydroelectric energy systems of FIG. 2, in a second configuration.
Figure 4:
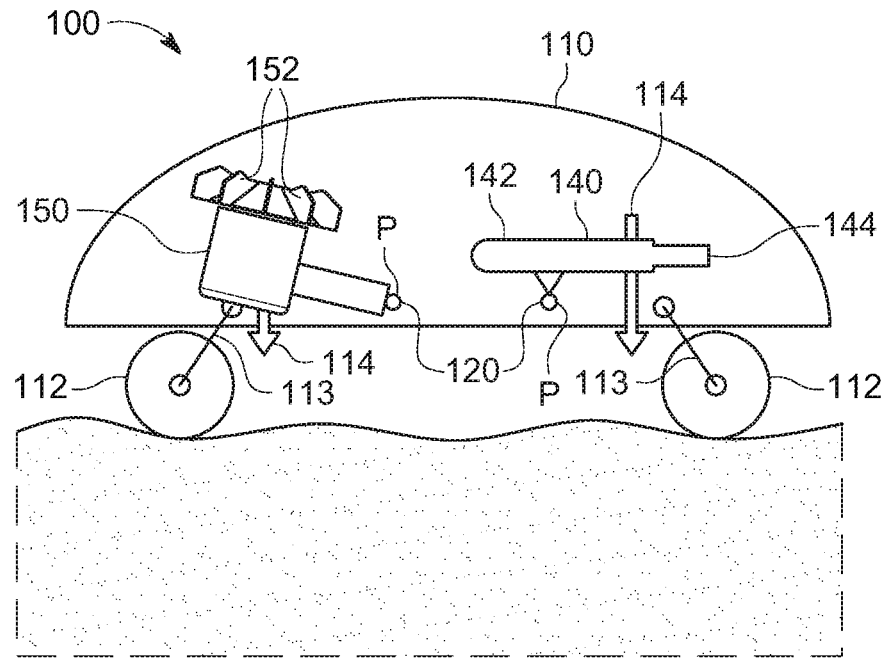
FIG. 4 is a side view of the system for deploying hydroelectric energy systems of FIG. 1, in the first configuration, with a foundation structure and hydroelectric turbine in accordance with the present disclosure.
Figure 5:
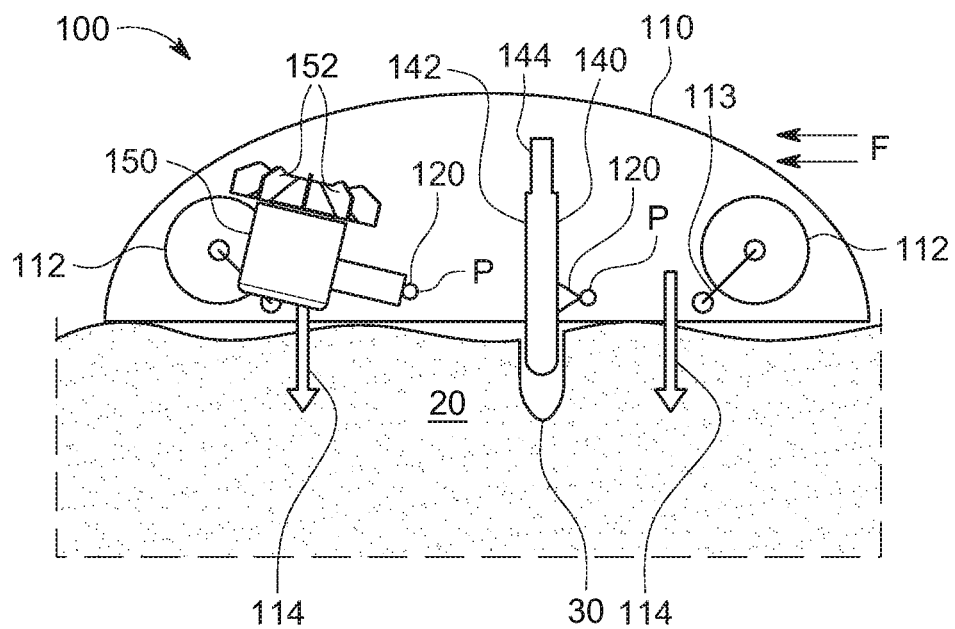
FIG. 5 is a side view of the system for deploying hydroelectric energy systems of FIG. 4, in the second configuration, with the foundation structure being deployed.
Figure 6:
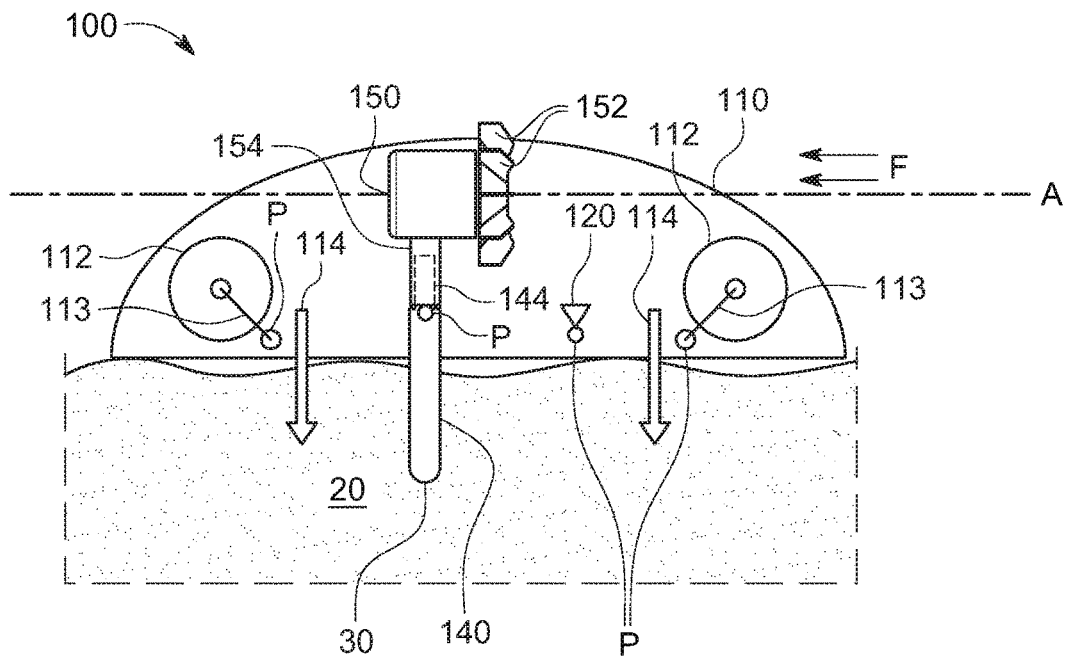
FIG. 6 is a side view of the system for deploying hydroelectric energy systems of FIG. 4, in the second configuration, with the hydroelectric turbine being deployed.

In various embodiments, for example, the aquatic vehicle 110 includes a lift mechanism 112 that is configured to raise and lower the aquatic vehicle 110 to transition the submersible aquatic vehicle 110 between the first and second configurations. As illustrated in FIGS. 1-6, in various exemplary embodiments, the lift mechanism 112 comprises a plurality of wheels, two out of four wheels 112 being shown in the side view of the exemplary submersible aquatic vehicle 110 in FIGS. 1-6. As shown by arrows L in FIG. 1, in accordance with various embodiments, the wheels 112 are configured to pivot up (e.g., at a respective pivot P via an arm 113) into the vehicle 110 and down onto a support surface, such as, for example, a ground surface 50 (e.g., sea or river bed), to transition the submersible aquatic vehicle 110 between the first and second configurations. In this manner, as illustrated in FIGS. 2 and 4, the aquatic vehicle 110 may drive to the deployment site 20 via the wheels 112. Then, as illustrated in FIGS. 3, 5, and 6, and in the dotted lines in FIG. 1, the wheels 112 may pivot up and out of the way to allow the submersible aquatic vehicle 110 to in effect "hunker down" at the deployment site 20 to help stabilize itself against fluid flow F (e.g., tidal currents F). To provide further stabilization, in various exemplary embodiments, the submersible aquatic vehicle 110 also includes an anchoring mechanism 114, such as, for example, a plurality of stakes 114 that are deployable in the second configuration. As illustrated in FIGS. 3, 5, and 6, when the submersible aquatic vehicle 110 lowers into the second configuration, the stakes 114 can be driven into the ground surface 50 of the deployment site 20 to anchor the submersible aquatic vehicle 110.

Those of ordinary skill in the art will understand, however, that the submersible aquatic vehicle 110 illustrated in FIGS. 1-6 is exemplary only and that submersible aquatic vehicles in accordance with the present disclosure may have various configurations, including various types and/or numbers of mechanisms to allow a transition between the first and second configurations, and various types and/or numbers of mechanisms to stabilize the submersible aquatic vehicle at the deployment site. For example, although the submersible aquatic vehicle of FIGS. 1-6 is illustrated with a lift mechanism including four wheels 112, various additional embodiments of the present disclosure contemplate the use of only two or three wheels. While further embodiments contemplate submersible aquatic vehicles that use other types of vehicle propulsion systems, such as, for example, continuous tracks (see, e.g., FIG. 42).

Those of ordinary skill in the art will further understand that submersible aquatic vehicles in accordance with the present disclosure may also utilize various techniques and/or mechanisms to provide stability both while driving and at the deployment site (i.e., in addition to and/or as an alternative to the stakes 114). In various embodiments, for example, when the subaquatic bed 50 is too hard (e.g., when it is solid rock) for stakes to effectively stabilize the submersible aquatic vehicle, the submersible aquatic vehicle 110 may be configured to drill anchors (not shown) into the solid rock. In various embodiments, for example, when the submersible aquatic vehicle 110 is in the second configuration, it may be connected to the anchors for stabilization. In various additional embodiments, as illustrated in FIG. 1, a bottom edge 115 of the vehicle 110 may include ridges 117 or other profiled surface features that form a gripping surface all along the bottom edge 115. As would be understood by those of ordinary skill in the art, such ridges 117 may increase the coefficient of static friction between the bottom edge 115 of the vehicle 110 and the ground surface 50 to also help stabilize the vehicle 110. In various further embodiments, as illustrated in the exemplary embodiments of FIGS. 10-14, stabilizing jacks 219, 319 may be deployed from a submersible aquatic vehicle 210, 310 to stabilize the vehicle 210, 310 while at the deployment site 20.

As further illustrated in FIGS. 1-6, in various embodiments, the aquatic vehicle 110 has an aerodynamic shape. For example, the submersible aquatic vehicle 110 has a curved (e.g., semi-ellipsoid or domed outer surface profile) that, for example, resembles the shape of a turtle's shell. In this manner, when the submersible aquatic vehicle 110 travels underwater to and is stabilized at the deployment site 20, the domed shape of the submersible aquatic vehicle 110 allows the tidal currents F to flow over it. Consequently, the hydrodynamic forces over the submersible aquatic vehicle 110 may also serve to press down on the vehicle 110 to better anchor it in place at the deployment site 20. In various further embodiments, the submersible aquatic vehicle 110 may include ballast material 116 as needed to balance, stabilize, and generally weigh down the vehicle (e.g., to help prevent the vehicle from floating upon water entry). In one exemplary embodiment, as illustrated in FIG. 1, the submersible aquatic vehicle 110 may include lead weights 116 in both a front portion 102 and a back portion 104 of the vehicle 110. Those of ordinary skill in the art will also understand that the domed shape illustrated in FIGS. 1-6 is exemplary only and that aquatic vehicles in accordance with the present disclosure may have various shapes and/or use various ballast materials and techniques, without departing from the scope of the present disclosure and claims.

As mentioned above, to allow the aquatic vehicle 110 to carry components (i.e., a payload) to and from the deployment site 20, the aquatic vehicle 110 utilizes at least one support that is affixed to the aquatic vehicle 110, such as, for example, payload mounts 120. In accordance with various embodiments, the payload mounts 120 are configured to pivot (e.g., via a respective pivot p) between a first, driving position (see FIGS. 2 and 4) and a second, deployment position (see FIGS. 3, 5, and 6). In various embodiments, for example, the payload mounts 120 are activated and controlled by a controller 106 (e.g., a remote embedded controller 106). For example, the payload mounts 120 are automated and the controller 106 is programed to also operate the payload mounts 120, such as after sensing a position, elapsed time period, and/or other state of the vehicle. Whereas, in various additional embodiments, the payload mounts 120 are activated and controlled remotely via an operator, such as an operator in a control room 580 shown in FIG. 40. In this manner, the payload mounts may carry a payload component in a first, hydrodynamic position (i.e., to minimize drag) as the vehicle 110 drives to the deployment site 20, and then rotate the payload component into a second position suitable for at the deployment site 20.

As illustrated in FIGS. 2 and 3, for example, in accordance with various exemplary embodiments, the system for deploying hydroelectric energy systems 100 also includes a boring mechanism 130 that is configured to be mounted to the at least one payload mount 120. The boring mechanism 130, for example, is a drill 130 that can be deployed at the deployment site 20 to drill a hole 30 for the hydroelectric energy system. In various embodiments, for example, the drill can include a subsea drill rig, as would be known by the those of ordinary skill in the art. In various embodiments, the drill 130 can be hard wired and/or wirelessly connected to the controller 106 of the aquatic vehicle 110, such that the controller 106 can activate and control the drill 130. In various additional embodiments, the drill 130 can be wirelessly connected to an on-shore location (e.g., the control room 580 or other control facility at the assembly site 10) and be remotely activated and controlled.

As illustrated in FIG. 2, the payload mount 120 holds the drill 120 in the first, driving position, in which it carries the drill 120 relatively parallel to the ground surface upon which the submersible aquatic vehicle 110 travels while it drives to the deployment site 20. Once the submersible aquatic vehicle 110 is stabilized at the deployment site 20, as illustrated in FIG. 3, the payload mount 120 is rotated to rotate the drill 130 into the second, upright, deployment position, in which it raises the drill 130 about 90 degrees into a drilling position (e.g., which is relatively perpendicular to the ground surface at the sight of deployment) to drill the hole 30. In various embodiments, for example, the drill 130 is configured to drill the hole 30 to a depth through a range of about 10 feet to about 40 feet, although such a range is nonlimiting and the depth of drilling may be determined based on a variety of factors, such as the type of bed being drilled into, the strength of the subaquatic current, and the configuration being of turbine being installed. Once the hole 30 is complete, the payload mount 120 can be rotated to position the drill 130 back into the first, driving position so that the submersible aquatic vehicle 110 may drive the drill 130 back to the first, assembly location (i.e., the hydroelectric turbine assembly site 10), where, for example, the drill 130 is removed and another component is mounted to the at least one payload mount 120.

Figure 7:
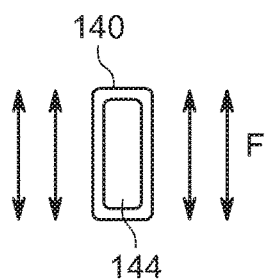
FIG. 7 is top view of a deployed foundation structure in accordance with the present disclosure.

As illustrated in FIGS. 4-6, for example, in accordance with various additional embodiments, the system for deploying a hydroelectric energy system further includes a foundation structure 140. The foundation structure 140 includes a first end 142 that is configured to be mounted to the at least one payload mount 120 (see FIG. 4) and later installed within the drilled hole 30 (see FIG. 5), and a second opposite end 144 that is configured to be coupled with a hydroelectric turbine 150 at the deployment site 20 (see FIG. 6). The foundation structure 140 may be manufactured using various techniques, such as, but not limited to, casting, molding, 3-D printing, etc. from any material suitable to support and anchor the hydroelectric turbine 150 at the deployment site 20. In various embodiments, for example, the foundation structure 140 may be cast from concrete. In various additional embodiments, the foundation structure 140 has a streamlined design to better allow the fluid flow F (e.g., tidal currents F) to flow over it. As illustrated in FIG. 7, for example, the foundation structure 140 may have an elongated cross-section such that a length of the cross-section is longer than a width of the cross-section, and is generally parallel to the fluid flow F. While FIG. 7 illustrates a rounded rectangular cross-section, an oval, rounded diamond, and other cross-sections also are envisioned.

As illustrated in FIG. 4, at the assembly site 10, the foundation structure 140 may be mounted to a first payload mount 120 of the submersible aquatic vehicle 110 and the hydroelectric turbine 150 may be mounted to a second payload mount 120 of the submersible aquatic vehicle 110. As above, the payload mounts 120 may respectively hold the foundation structure 140 and the hydroelectric turbine 150 in the first, driving position, in which the mounts 120 carry the components relatively parallel to a ground surface on which the submersible aquatic vehicle 110 travels while the it drives to the deployment site 20. Once the submersible aquatic vehicle 110 is stabilized again at the deployment site 20, as illustrated in FIG. 5, the first payload mount 120 is rotated to rotate the foundation structure 140 about 90 degrees into the second, deployment position, which raises the foundation structure 140 into a deployment position (e.g., relatively perpendicular to the ground surface at the site of deployment) to install the foundation structure 140 within the previously drilled hole 30 (e.g., to position the first end 142 of the foundation structure 140 within the hole 30). Various embodiments of the present disclosure further contemplate filling a cement and/or grout material within the hole 30 to anchor the foundation structure within the hole 30.

Figure 8:
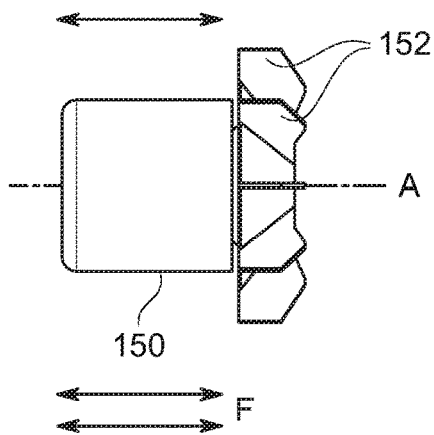
FIG. 8 is a top view of a deployed hydroelectric turbine in accordance with the present disclosure.

Once the foundation structure 140 is installed within the hole 30, as illustrated in FIG. 6, the second payload mount 120 is rotated to rotate the hydroelectric turbine 150 into the second, deployment position, which raises and turns the hydroelectric turbine 150 about 90 degrees into a deployment position (e.g., such that a base 154 of the turbine 150 is relatively perpendicular to the ground surface) to install the hydroelectric turbine 150 on the foundation structure 140. In various embodiments, for example, a anchoring spire 154 of the hydroelectric turbine 150 is configured to receive the second end 144 of the foundation structure 140 (alternatively the foundation structure 140 may receive the anchoring spire 154). As illustrated in FIGS. 6 and 8, in this manner, the foundation structure 140 may support the hydroelectric turbine 150 in the fluid body, such that the fluid flow F having a directional component flow generally parallel to an axis of rotation A of the turbine 150 may act on blades 152 of the turbine 150 to cause the rotor of the turbine 150, via the blades 152, to rotate about the axis of rotation A. Once installation of the hydroelectric turbine is complete, the submersible aquatic vehicle 110 may drive back to the first, assembly location or other location for storage when not in use.

As would be understood by those of ordinary skill in the art, the system 100 for deploying hydroelectric energy systems contemplated by the present disclosure may have various configurations and/or numbers of mounts and other devices for both carrying payloads back and forth between the first and second locations and deploying such components at the deployment site 20; the system 100, including the payload mounts 120, illustrated in FIGS. 1-6 are intended to be exemplary only. Various additional embodiments of the present disclosure, for example, contemplate systems 100 that include only one payload mount 120, such that the aquatic vehicle 110 must make separate trips to carry and deploy the foundation structure 140 and the hydroelectric turbine 150. While various further embodiments contemplate that the system 100 includes two or more payload mounts, such that the aquatic vehicle 110 only needs to make one trip to the deployment site 20 (i.e., the system 100 is configured to drill the hole 30 and deploy the complete hydroelectric energy system all in one trip). Those having ordinary skill in the art would further appreciate that payload mounts in accordance with the exemplary embodiments may have a variety of structures, such as clamps and the like, to securely hold the various payload components to be driven and deployed at the subaquatic site.

As illustrated in FIGS. 10-18, in still further exemplary embodiments, systems 200, 300 and methods for deploying hydroelectric energy systems may include payload mounts that have telescoping components for mounting and deploying the payload components (e.g., a boring mechanism, such as, for example, a subsea drill 230, 330, foundation structure 340, and/or hydroelectric turbine 350). As illustrated in FIGS. 10-14, such telescoping mounts 220, 320 can retract into the vehicle body and be extendable out from the body of the vehicle to allow a carrying position and a deployment position, respectively. The systems may further include a pivoting lever arm 222, 322 at a distal end of a first link 221, 321 of the telescoping systems 220, 320 to pivot between a parallel position with the first link 221, 321, for retraction, and to a perpendicular position relative to the first link 221, 321, for deployment. Such embodiments, may further include various types of fastening/gripping mechanisms, as will be understood by those of ordinary skill in the art, such that the telescoping mounts 220, 320 may securely carry the payload components to/from the deployment site.

Referring now to FIGS. 13-18, a submersible aquatic vehicle 310 may include a first telescoping deployment system 320, a second telescoping deployment system 325, and a telescoping grab arm 360 at different locations of the vehicle 310. In a first trip of the submersible aquatic vehicle 310 to the deployment site 20, for example, the vehicle 310 may utilize the first telescoping deployment system 320 to deploy a drill 330 to drill a hole 30 at the deployment site 20 (see FIG. 13). In a second trip (e.g., after the vehicle 310 returns the drill 330 to the assembly site 10 and transports a foundation structure 340 to the deployment site 20), the vehicle 310 may then utilize the first telescoping deployment system 320 to install a foundation structure 340 within the hole 30 (see FIG. 14). In a third trip (e.g., after the vehicle 310 returns to the assembly site 10 and transports a hydroelectric turbine 350 to the deployment site 20), the vehicle 310 may utilize a telescoping grab arm 360 to latch onto the foundation structure 340 (e.g., to secure the vehicle 310 relative to the foundation structure 340) and a second telescoping deployment system 325 to position and install the turbine 350 on top of the foundation structure 340 (see FIGS. 15-18), as described above with reference to FIG. 6.

With reference now to the embodiments of FIGS. 19-43, in accordance with various additional embodiments of the present disclosure, various systems for deploying hydroelectric energy systems using submersible aquatic vehicles having an industrial hauling and dumping truck type configuration are illustrated. Systems 400, 500, 600, 700 for deploying hydroelectric energy systems may include a submersible aquatic vehicle 410, 510, 610, 710 configured to submerge itself and drive to the deployment site 20 under a body of water 40 (see FIG. 40). The systems 400, 500, 600, 700 also include at least one mounting assembly 420, 520, 620, 720 affixed to the aquatic vehicle 410, 510, 610, 710, wherein one mounting assembly is shown in each of the embodiments of systems 400, 500, 600, 700. As illustrated, for example, in FIG. 22, and as will be described in further detail below, the mounting assembly 420, 520, 620, 720 is configured to transition between a first position to carry a payload, such as, for example, a hydroelectric turbine 450, 550 with anchoring spire 455, 555 to the deployment site 20, and a second position to orient and deploy the payload (at the deployment site 20).

Various embodiments of the present disclosure, for example, contemplate utilizing the overall body and lifting mechanisms of heavy excavation trucks, such as, for example, pit butte mining trucks, including, but not limited to, the Caterpillar 797 and 785, manufactured by Caterpillar Inc. The systems and methods of the present disclosure contemplate, however, that the overall body and lifting mechanisms of various types of ultra-class haul trucks may be utilized, including, but not limited to, the Komatsu 960E-1 and 980E-4, manufactured by Komatsu America Corp.; the BelAZ 75600 and 75710, manufactured by BelAZ; the Bucyrus MT6300AC, manufactured by Bucyrus International; and the Liebherr 282B, manufactured by Liebherr. Such trucks may, for example, be retrofit with the support 420, 520, 620, 720 and the autonomous components and controllers described above with reference to the exemplary embodiment of the submersible aquatic vehicle 510 described herein. For example, in accordance with various embodiments, the submersible aquatic vehicle 510 may, for example, make use of the tires, wheels, suspension system, frame, brakes, and various drive train components of the truck; while replacing the passenger cab, diesel engine, fuel system, and dumping bed of the truck with the support 520 and the autonomous components and controllers. The present disclosure contemplates, for example, that the submersible aquatic vehicle 510 may draw its energy from batteries (e.g., enclosed in a pressurized chamber), which may be converted to hydraulic pressure as needed, and may be propelled by electro-hydraulic motors or electric motors (e.g., 568 as illustrated in FIG. 37).

As illustrated, for example, in the embodiments of FIGS. 19-43, in various exemplary embodiments, the submersible aquatic vehicle 410, 510 comprises a first set of wheels 413, 513 positioned at a first end (e.g., front end) 401, 501 of the vehicle 410, 510 and a second set of wheels 413, 513 positioned at a second end (e.g., back end) 402, 502 of the vehicle 410, 510. The aquatic vehicle 410, 510 also includes a chassis 411, 511 extending along a longitudinal axis A (see FIGS. 21, 27, and 29) of the vehicle 410, 510 between the first and second sets of wheels 413, 513. As illustrated best perhaps in the embodiment of FIGS. 19-22, which shows multiple different views of the vehicle 410, in various exemplary embodiments the first set of wheels 413 (e.g., the wheels located at the front of the vehicle 410) comprises two wheels 413, one wheel 413 of the first set of wheels 413 being positioned on each side of the chassis 411. And the second set of wheels 413 (e.g., the wheels located at the back of the vehicle 410) comprises four wheels 413, two wheels 413 of the second set of wheels 413 being positioned on each side of the chassis 411.

Figure 42:
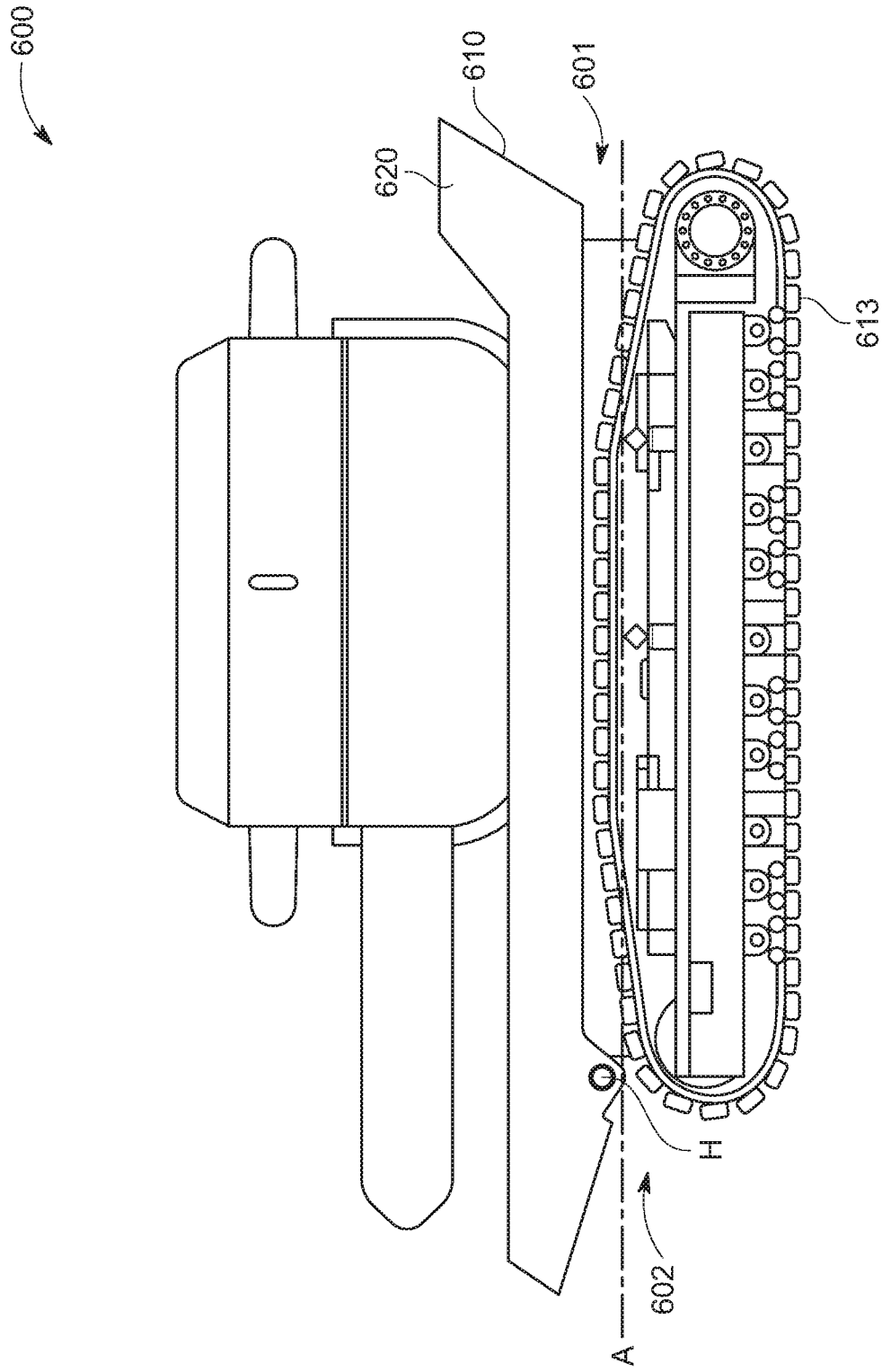
FIG. 42 shows a side view of another exemplary embodiment of a system for deploying hydroelectric energy systems with a continuous track in accordance with the present disclosure.

Those of ordinary skill in the art would understand, however, that the above aquatic vehicle 410, 510, which resembles a heavy excavation truck, is exemplary only and that various other types of vehicles, which utilize various types and configurations of propulsion systems, may be retrofit to be submersible and with the disclosed supports and autonomous components and controls as disclosed herein, and be used to deploy payloads in accordance with various exemplary embodiments of the present disclosure. As illustrated in the embodiment of FIG. 42, for example, in various further embodiments a submersible aquatic vehicle 610 may include a continuous track 613, such as, for example, a caterpillar track or a tank track, in lieu of wheels. Such tracking systems may be used as a substitute for wheels, for example, when the vehicle is required to travel on soft soils. Similar to the vehicle 410, 510, the vehicle 610 also includes a chassis 611 affixed to the continuous track 613, such that the chassis extends along a longitudinal axis A of the vehicle 610 between a first end 601 of the vehicle 610 and a second end 602 of the vehicle 610.

As illustrated with reference to the system 500 in FIGS. 23-32, in accordance with one embodiment, the mounting assembly 520 includes a lifting frame 514, a sliding frame 516 positioned at least partially within the lifting frame 514, and a payload carriage 518 affixed to the sliding frame 516. In various embodiments, for example, the mounting assembly 520 and its component parts (i.e., the lifting frame 514, sliding frame 516, and payload carriage 518) may be made of a metal or composite material, while in various additional embodiments the mounting assembly 520 and its components can be 3-D printed, or formed via additive manufacturing. Those of ordinary skill in the art would understand that the mounting assembly 520, including the lifting frame 514, sliding frame 516, and payload carriage 518 may be made using various processes and using various materials without departing from the scope of the present disclosure and claims.

Figure 23:
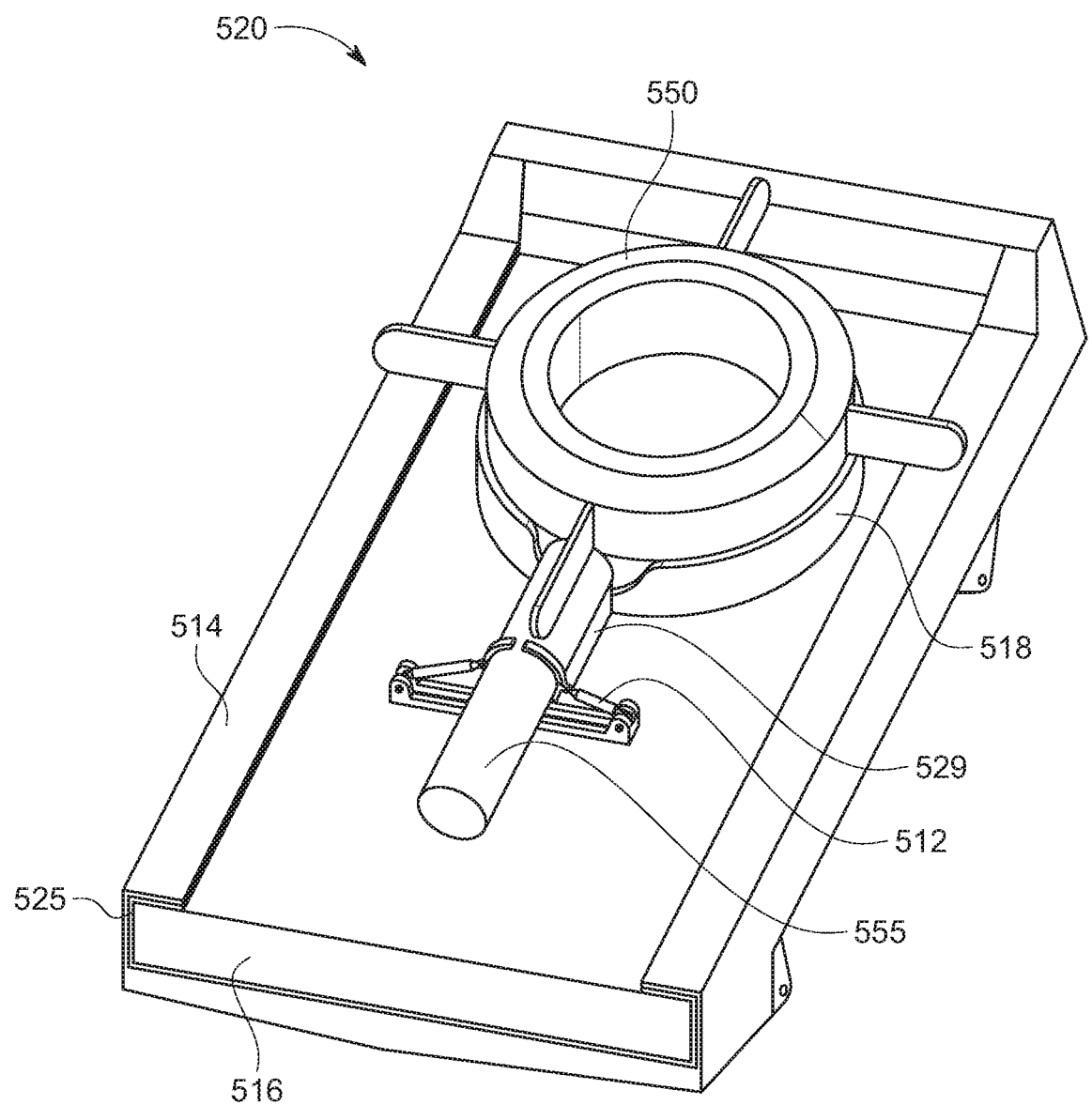
FIG. 23 is a top perspective view of an exemplary embodiment of a support for carrying a hydroelectric energy system in accordance with the present disclosure.
Figure 24:
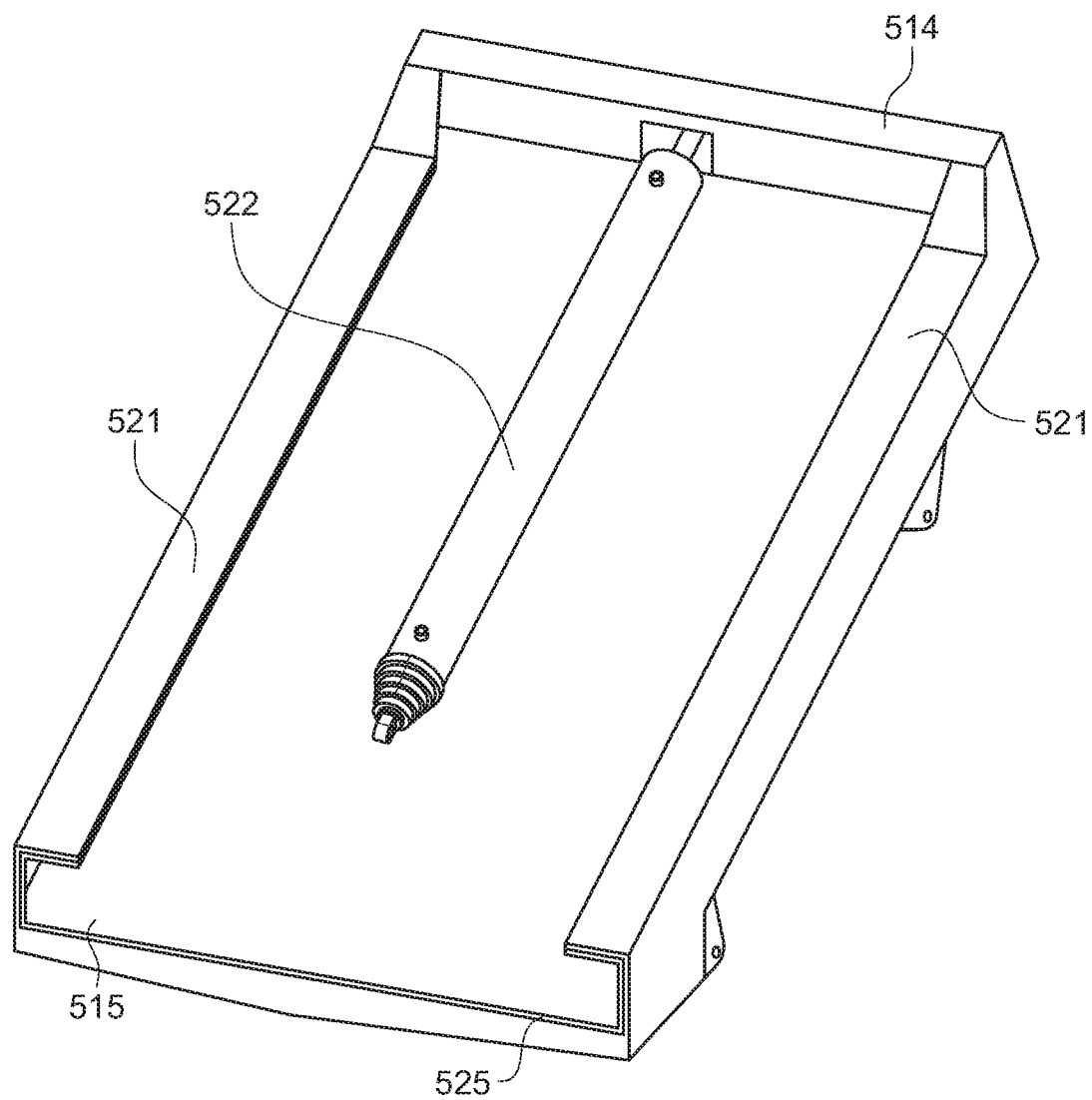
FIG. 24 is a top perspective view of an exemplary embodiment of a lifting frame of the support of FIG. 23.
Figure 25:
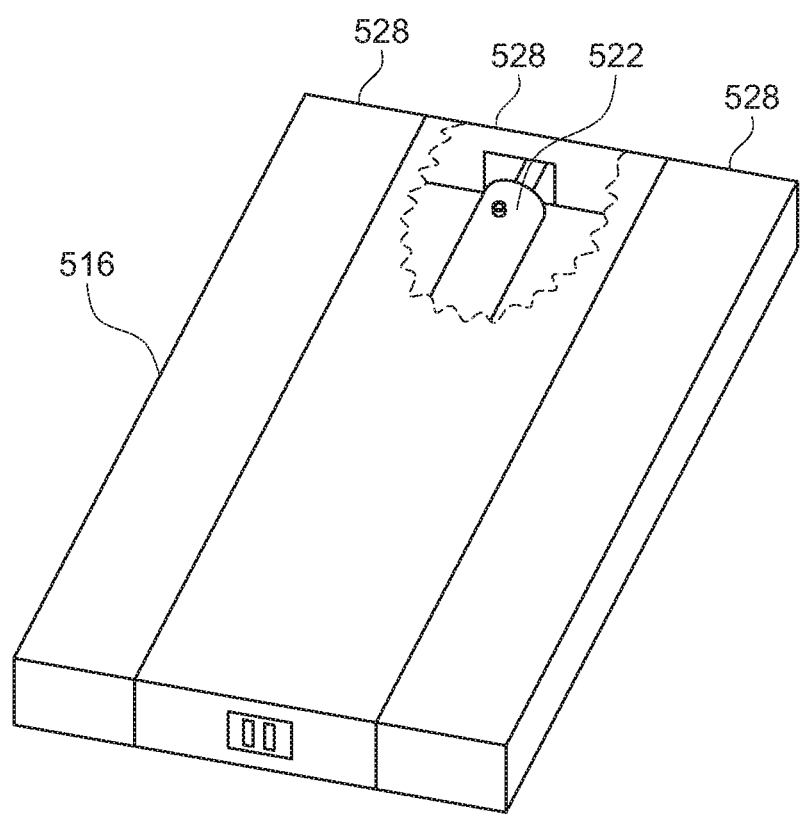
FIG. 25 is a top perspective view of a sliding frame of the support of FIG. 23.

With reference to FIG. 24, the lifting frame 514 comprises a bed 515, with retention plates 521 extending laterally inward from a top portion of each lateral side of the bed 515. In one exemplary embodiment, the plates 521 extend about two feet from the top of each side of the bed 515 to form a box-like structure that holds the sliding frame 516 relative to the lifting frame 514 (see FIG. 23). With reference now to FIG. 25, the sliding frame 516 comprises a hollow box-like structure that is configured to slide in and out of the lifting frame 514. In this manner, as illustrated in FIG. 23, the mounting assembly 520 may function like a "matchbox" with the lifting frame 514 operating like the outer box and the sliding frame 516 operating like the inner box. In various embodiments, for example the sliding frame 516 has three hollow chambers 528, including a central flooding chamber 528 sandwiched between two sealed (i.e., non-flooding) cambers 528. The flooding chamber 528 may, for example, have openings which accommodate a telescoping hydraulic lift mechanism 522, which extends between the lifting frame 514 and the sliding frame 516 and is configured to slide the sliding frame 516 relative to the lifting frame 514 (i.e., slide the sliding frame 516 in and out of the lifting frame 514). In this manner, the flooding chamber 528 floods with water (e.g., sea water) as the vehicle 510 is submerged.

Figure 45:
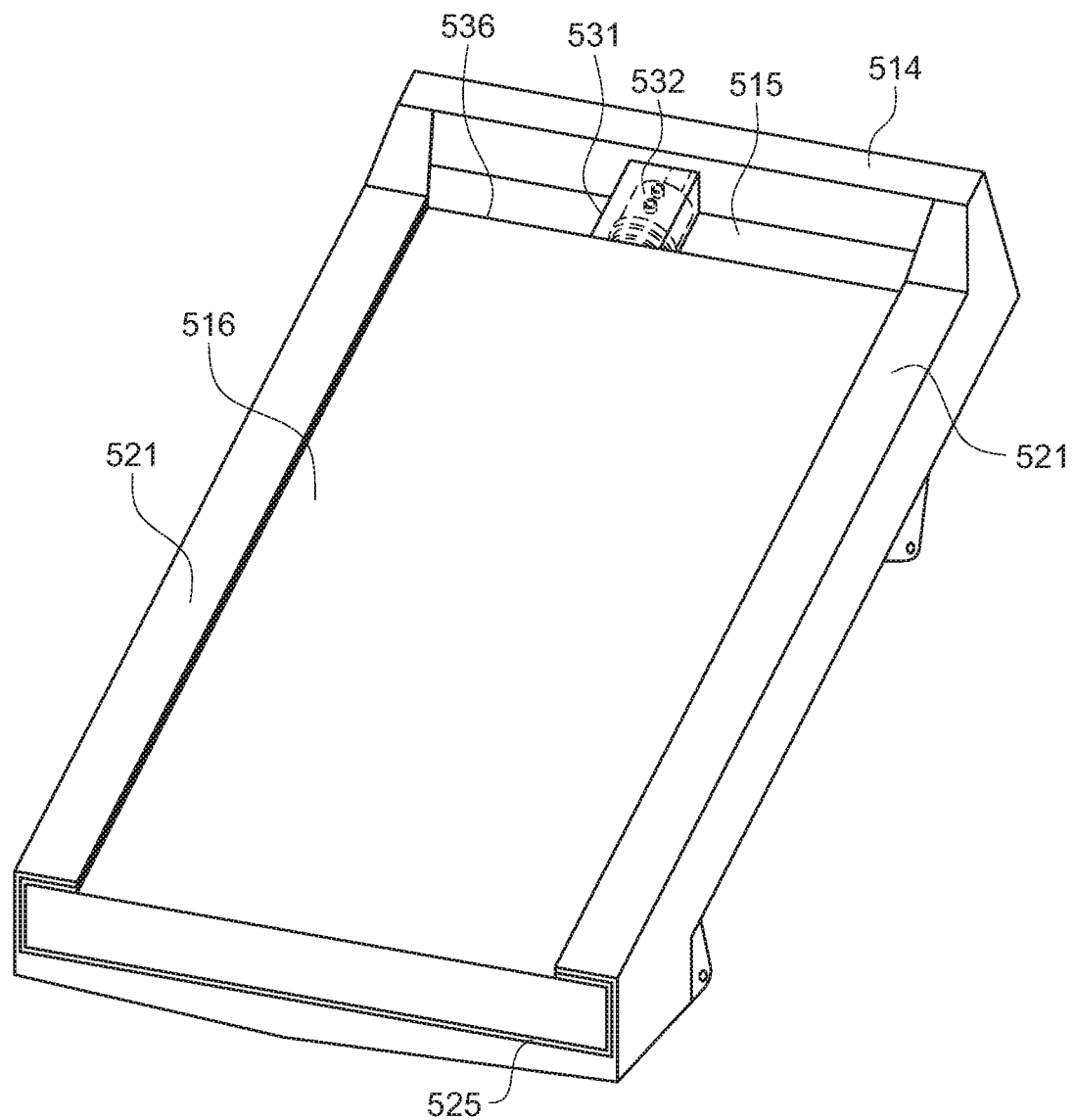
FIG. 45 shows another exemplary embodiment of a lifting and sliding frame assembly in accordance with the present disclosure.

In various additional embodiments, the sliding frame 516 has three sealed chambers 528 (e.g., the central chamber 528 is also a non-flooding chamber). In this embodiment, as illustrated in FIG. 45, the telescoping hydraulic lift mechanism (e.g., a 5-stage telescoping hydraulic cylinder 532) is positioned outside the sliding frame 516, for example, within an elongated box 531, which may instead flood. The box 531 is, for example, affixed to the bed 515 of the lifting frame 514 and an end 536 of the sliding frame 516. The box 531 is, for example, configured to house the hydraulic cylinder 532 in a fully retracted position (e.g., when the sliding frame is fully within the lifting frame) as shown in FIG. 45. In various embodiments, for example, to minimize its size, the elongated box 531 is only slightly larger than the fully retracted cylinder 532, such as, for example, only about 2 feet long. In this manner, to slide the sliding frame 516 relative to the lifting frame 514 (i.e., slide the sliding frame 516 in and out of the lifting frame 514), the cylinder 532 is telescoped outward from the box 531 (i.e., to push the sliding frame 516) and retracted back into the box 531 (i.e., to pull the sliding frame 516). In accordance with various embodiments, for example, when fully extended, the cylinder 532 can push the sliding frame 516 down the lifting frame 514 about 10 feet, and then when retracted, can pull the sliding frame 516 back up the lifting frame 514 to its original position. Those of ordinary skill in the art will understand, however, that the size and configuration of the box 531 and cylinder 532 are exemplary only and may be adjusted based on a given application (e.g., based on the size and configuration of a given lifting/sliding frame assembly and the distance that the cylinder must push the sliding frame down the lifting frame to deploy a payload).

Figure 44:
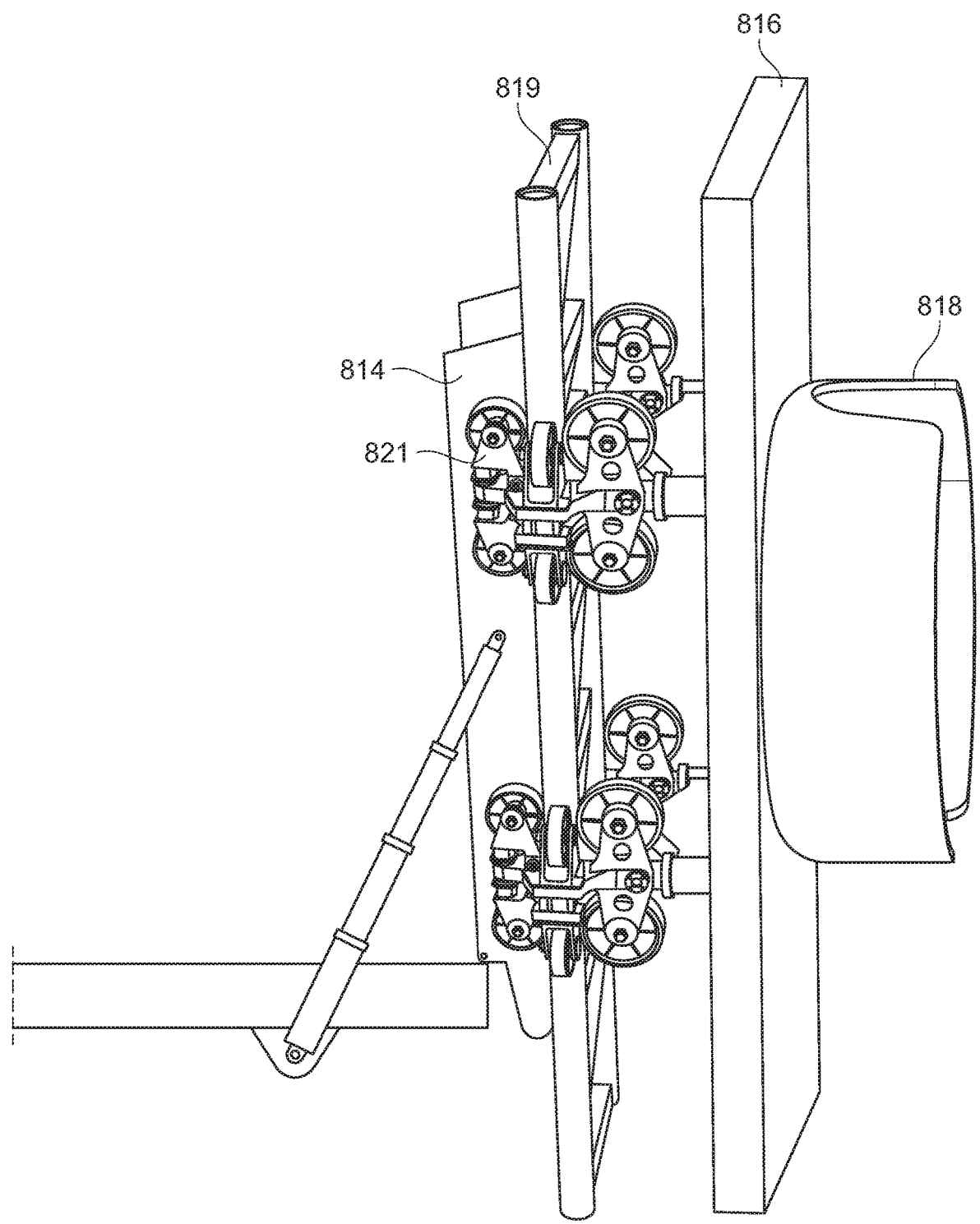
FIG. 44 shows an exemplary embodiment of a lifting and sliding frame assembly that utilizes a wheel and track engagement similar to roller coaster technology.

To facilitate the sliding of sliding frame 516 relative to the lifting frame 514, in various exemplary embodiments, the lifting frame 514 can have a lubricating liner 525 or coating, positioned to reduce friction between surfaces of the lifting frame 514 and the sliding frame 516, such as, for example, a thermal plastic material 525 affixed to (via a coating or otherwise secured lining) inner surfaces of the lifting frame 514 and/or outer surfaces of the sliding frame 516. In various embodiments, for example, Vesconite plates 525 may be affixed to the inner surfaces of the lifting frame 514 and/or the outer surfaces of the sliding frame 516. Those of ordinary skill in the art will understand, however, that various materials, methods, and/or techniques may used to slide the sliding frame 516 relative to the lifting frame 514, in combination with or as an alternative to the above telescoping hydraulic lift mechanism 522 and thermal plastic material 525. Furthermore, the illustrated lifting frame 514 and sliding frame 516 are exemplary only and may each have various designs and/or configurations, which may move relative to one another, without departing from the scope of the present disclosure and claims. Various additional embodiments of the present disclosure contemplate, for example, moving the sliding frame 516 relative to the lifting frame 514 via wheel and track assemblies like those used on roller coasters. Each wheel assembly, for example, has three wheels. Reference is made to FIG. 44 for an exemplary lifting frame 814/sliding frame 816 assembly that uses such a wheels and track configuration. As illustrated in FIG. 44, for example, in various exemplary embodiments, such a configuration may include a wheeled cart 818 movably secured to a track 819 via wheel assemblies 821.

Figure 26A:
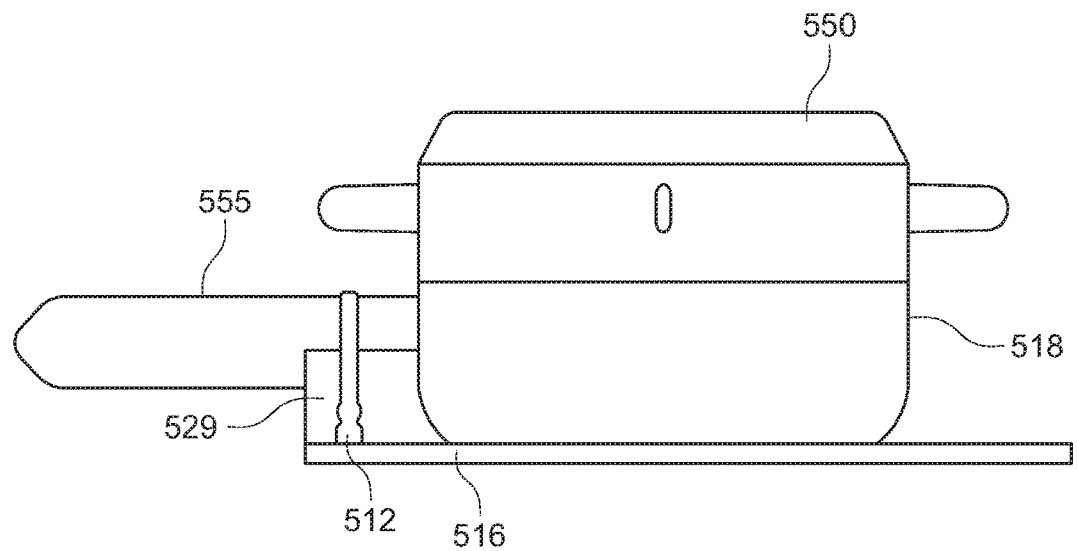
FIGS. 26A-C show side and bottom views of a payload carriage and grapping mechanism of the support of FIG. 23.
Figure 26B:
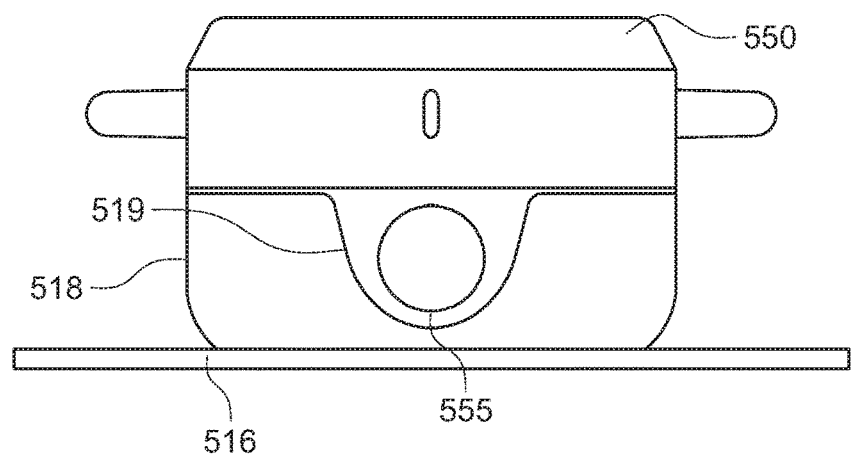
Figure 26C:
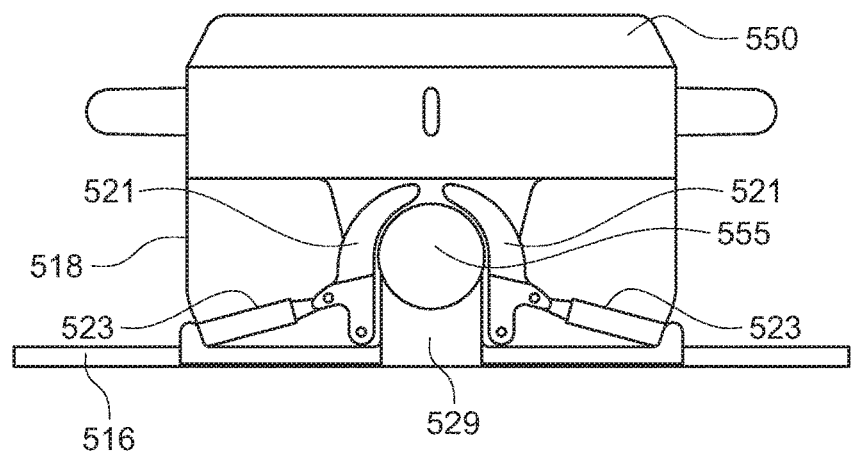
Figure 27:
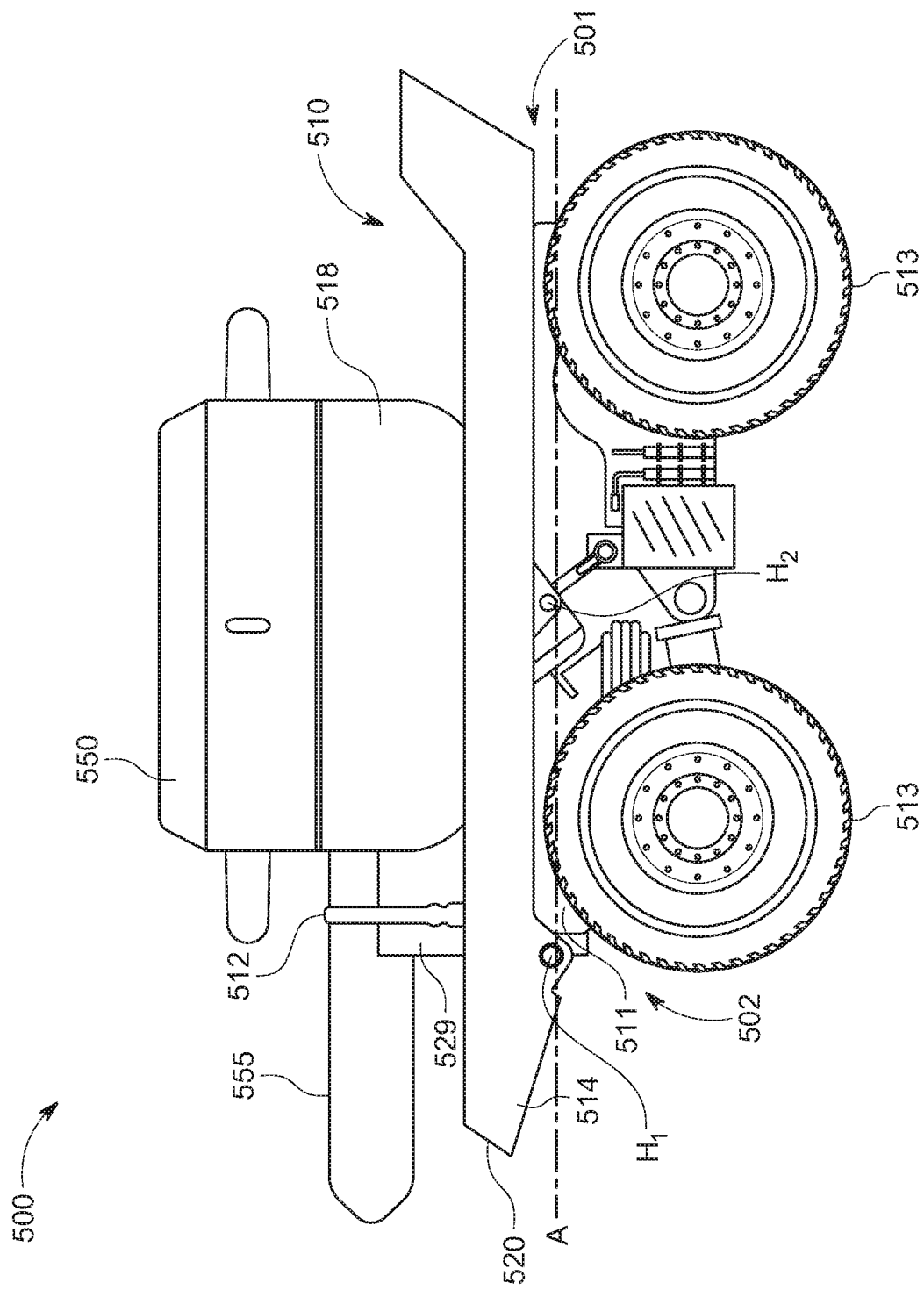
FIGS. 27-34 show side views of another exemplary embodiment of a system for deploying hydroelectric energy systems illustrating exemplary steps to deploy a hydroelectric energy system utilizing the support of FIGS. 23-26.
Figure 28:
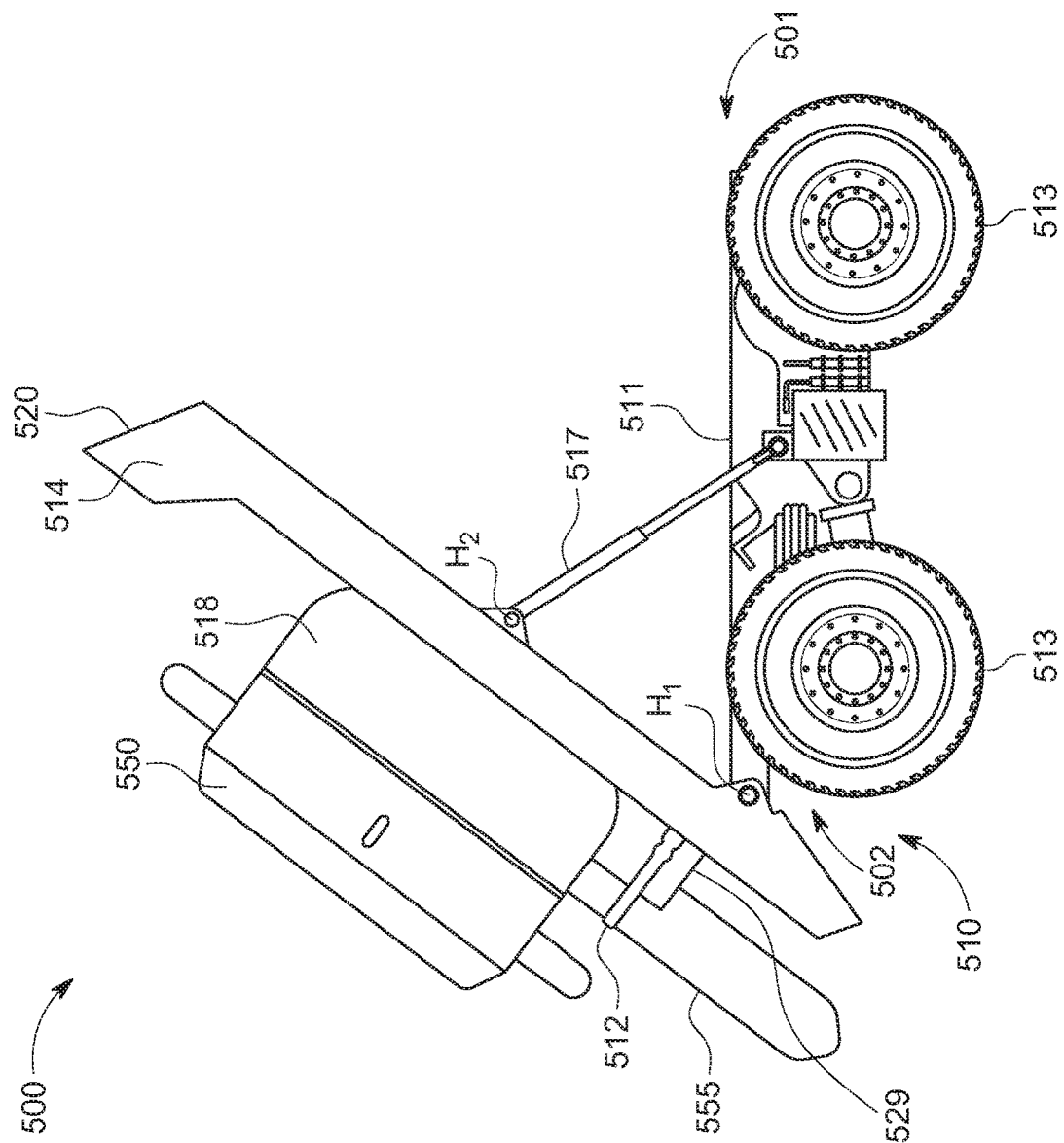
Figure 29:
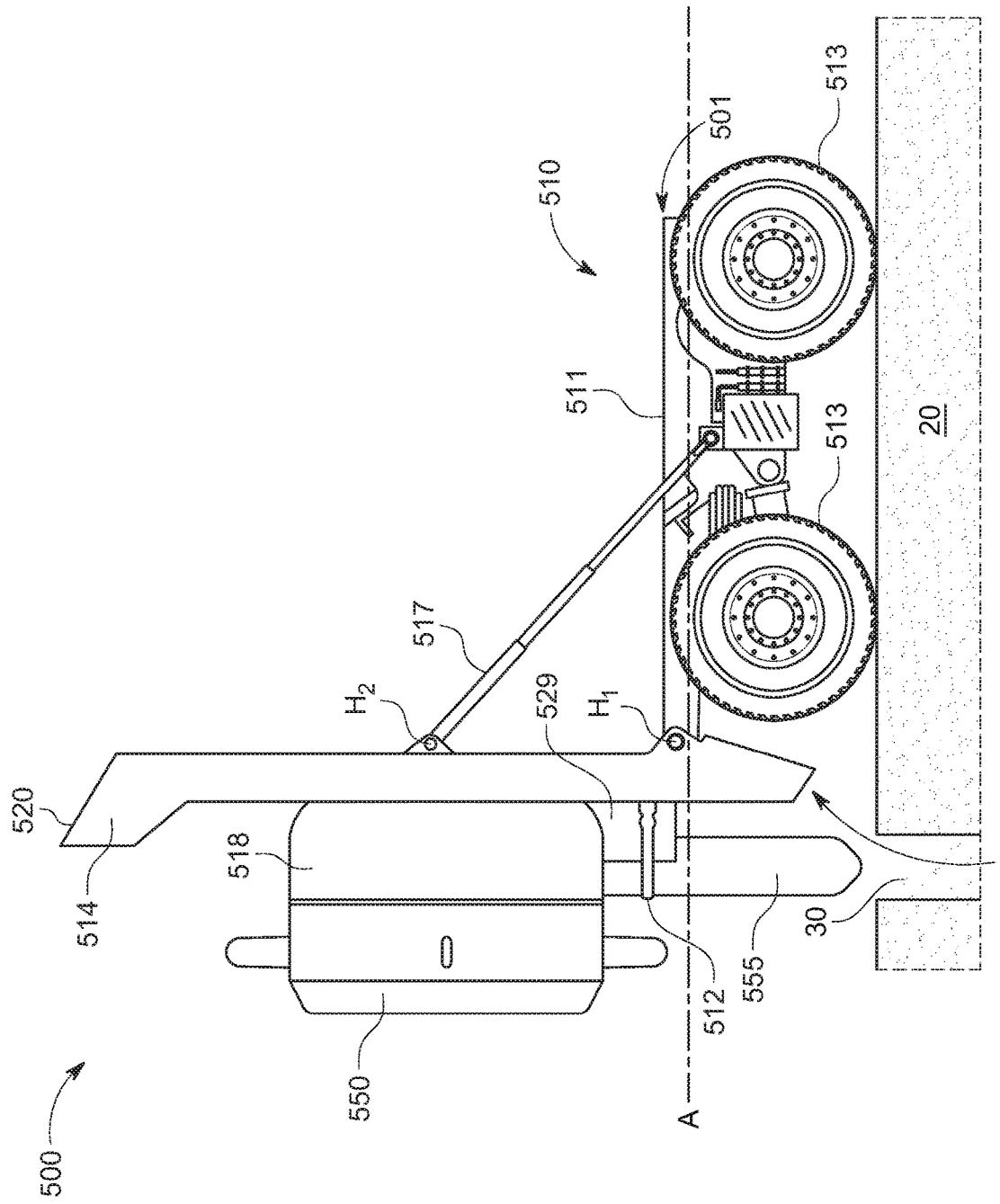
Figure 30:
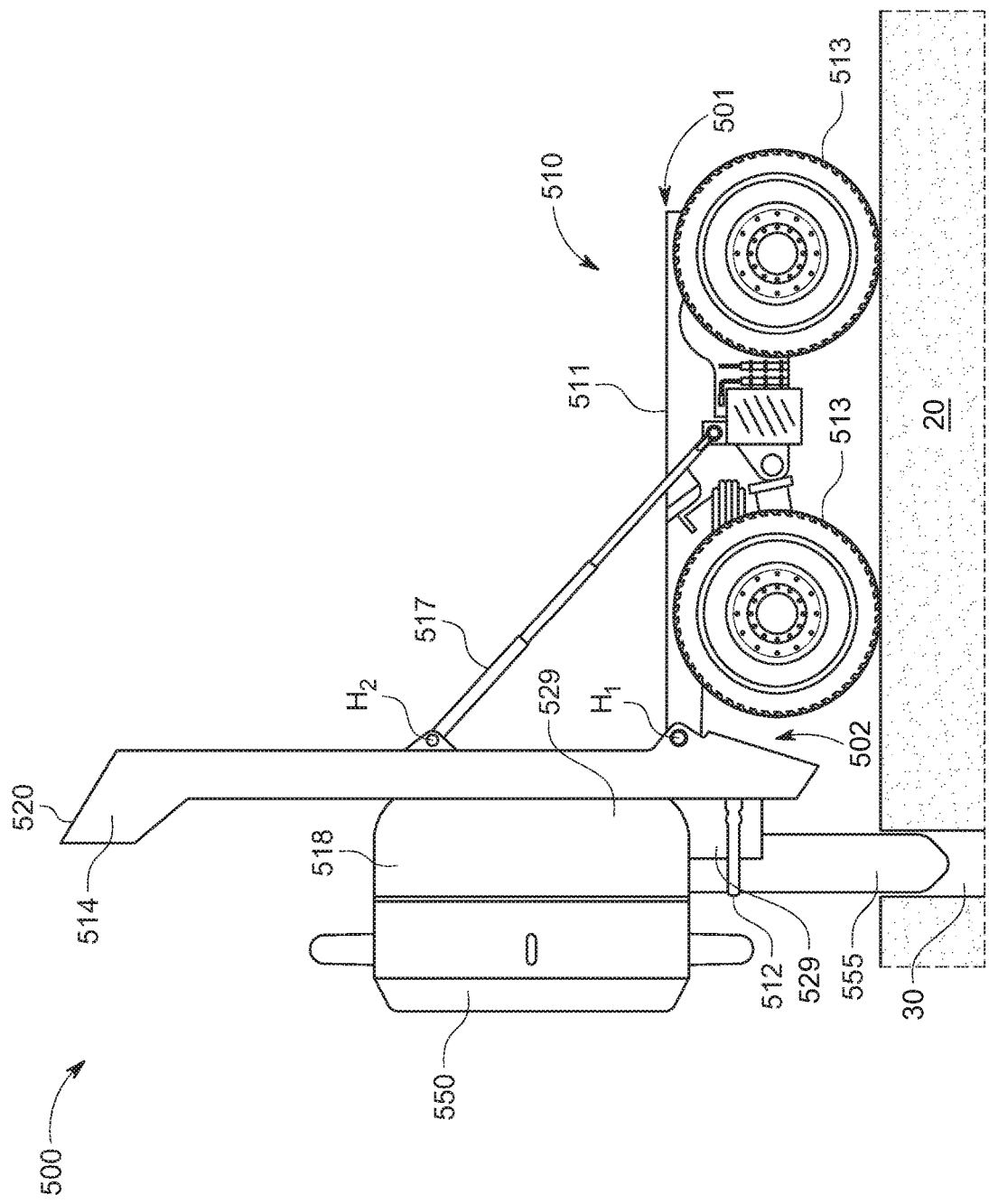
Figure 31:
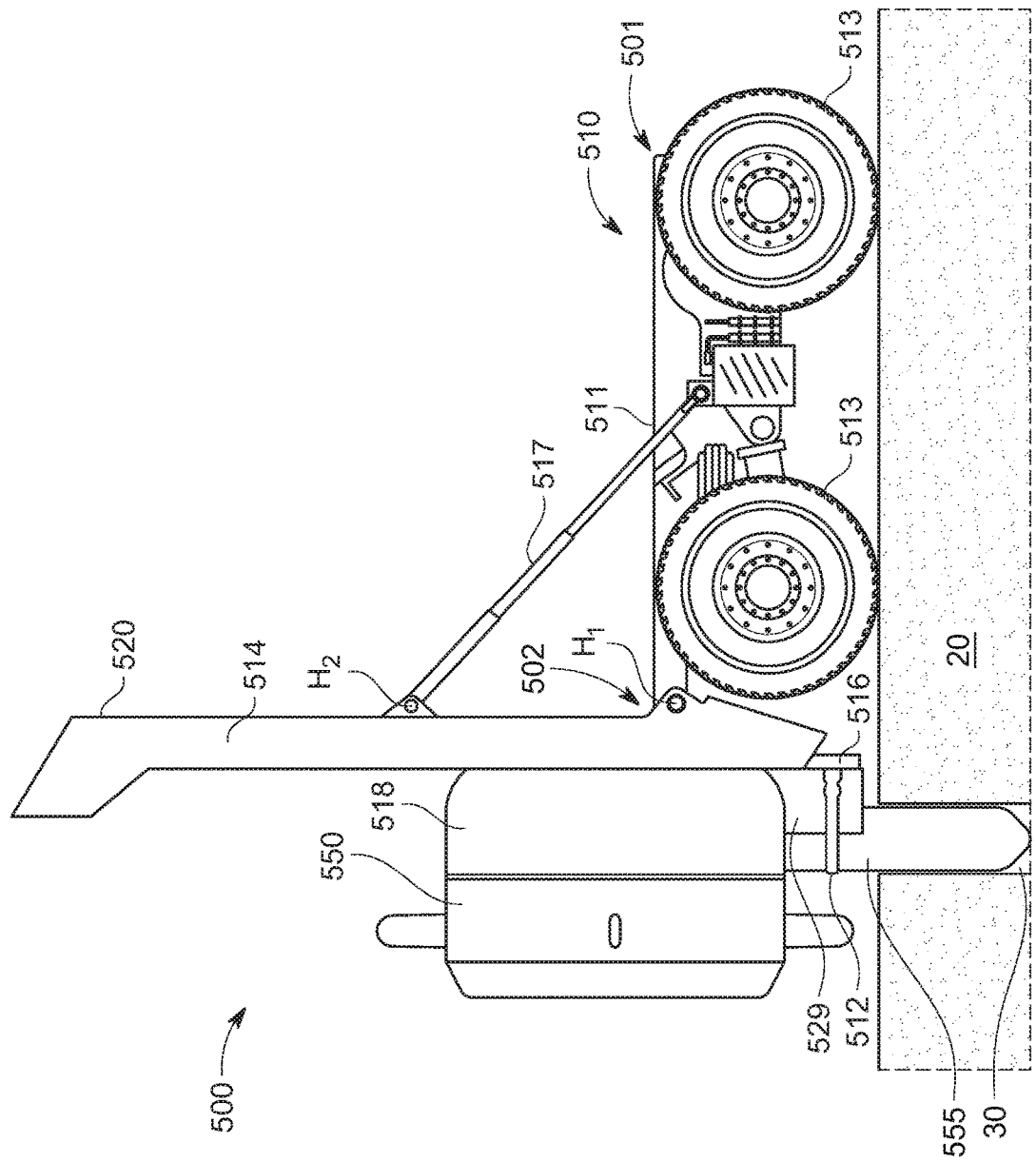

As illustrated in FIGS. 23 and 26A-C, the payload carriage 518 is affixed to the top of the sliding frame 516 and is configured to carry the payload, such as, for example, a hydroelectric turbine 550 with anchoring spire 555. As best illustrated in the bottom view of FIG. 26B, the payload carriage 518 may have a basket-like shape configured to cradle the hydroelectric turbine 550 and including an opening 519 for the spire 555. As further illustrated in FIGS. 26A and 26C, in accordance with various embodiments, the support 520 may also include a spire cradle 512 and a gripping mechanism 529, each affixed to the sliding frame 516 adjacent to the opening 519 in the carriage 518. The gripping mechanism 529 may, for example, include a pair of hydraulic arms 523 each with a gripper claw 521 at its end (see FIG. 33). As illustrated in FIGS. 26C and 33, in this manner, the arms 523 may be positioned on opposite sides of the spire cradle 512 from each other, such that the gripper claws 521 may firmly hold the anchoring spire 555 of the turbine 550, when the aquatic vehicle 510 is carrying and deploying the turbine 550 (see FIGS. 27-32). As described further below, once the hydroelectric turbine 550 is fully deployed, for example, the anchoring spire 555 is implanted and grouted (see FIG. 36) into a pre-drilled hole 30 at the deployment site 20, the grippers 521 may open to release the spire 555 (see FIG. 33), thereby releasing the turbine 550 from the support 520 (see FIG. 34).

As will be understood by those or ordinary skill in the art, the payload carriage 518, spire cradle 512, and gripping mechanism 529 may be sized and configured as required for an intended deployment application. In this manner, these component parts may be switched out as required to deploy different types and sizes of payloads (e.g., different sizes of hydroelectric energy systems having turbines 550 and spires 555 with different diameters). For example, different assemblies, including the carriage 518, cradle 512, and gripping mechanism 529, may be attached to the sliding frame 516 of the mounting assembly 520 based on a given deployment application. Those of ordinary skill in the art will understand how to design such components to properly fit an intended payload.

With reference now to FIGS. 27-34, as discussed above, the mounting assembly 520 is configured to transition between a first position to carry a payload, such as, for example, the hydroelectric turbine 550 and spire 555, to the deployment site 20 (see FIG. 27), and a second position to orient the payload for deployment at the deployment site 20 (see FIGS. 29-34). In various embodiments, for example, the lifting frame 514 of the mounting assembly 520 is pivotably attached to the chassis 511 of the vehicle 510 via a first hinge $H_1$ at the second end 502 of the vehicle 510. A telescoping hydraulic lift mechanism 517 also extends between the chassis 511 and the lifting frame 514 and is pivotably attached to the lifting frame 514 via a second hinge $H_2$. In this manner, upon reaching the deployment site 20, as illustrated sequentially in FIGS. 27-29, the hydraulic lift mechanism 517 is configured to pivot the lifting frame 514 about the first and second hinges $H_1$ and $H_2$ to transition the lifting frame 514 between a first horizontal position, in which the lifting frame 514 is parallel to the longitudinal axis A of the vehicle 510 (see FIG. 27), and a second vertical position, in which the lifting frame 514 is perpendicular to the longitudinal axis A (see FIG. 29). In other words, upon reaching the deployment site 20, the vehicle 510 may, like a bed of a dump truck, pivot the lifting frame 514 up toward the second end (i.e., back end) 502 of the vehicle in order to orient the hydroelectric turbine 550 and anchoring spire 555, carried by the lifting frame 514, over a pre-drilled hole 30 in the ground at the deployment site 20.

As above, the mounting assembly 520 also includes a telescoping hydraulic lift mechanism 522 that extends between the lifting frame 514 and the sliding frame 516. In this manner, once the lifting frame is in the second vertical position (i.e., such that the hydroelectric turbine 550 and anchoring spire 555, which are attached to the sliding frame 516, are oriented over the hole 30), as illustrated sequentially in FIGS. 29-31, the telescoping hydraulic lift mechanism 522 is configured to slide the sliding frame 516 relative to the lifting frame 514 to transition the sliding frame 516 between a first vertical position (see FIG. 29) and a second vertical position (see FIG. 31). In other words, once the anchoring spire 555 of the turbine 550 is oriented above the hole 30, the sliding frame 516 slides out of the lifting frame and towards the ground to lower the anchoring spire 555 into the hole 30.

Figure 32:
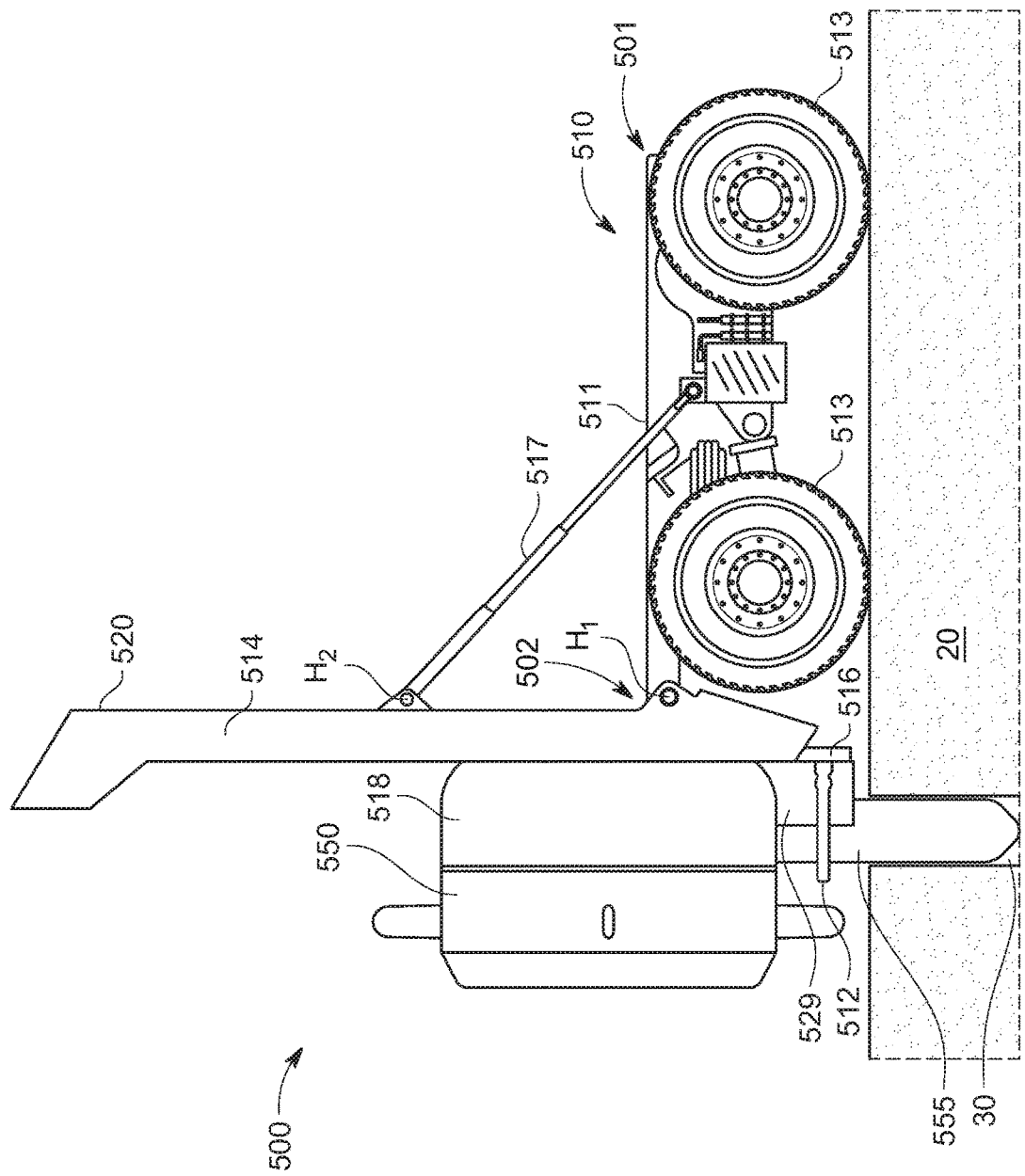
Figure 33:
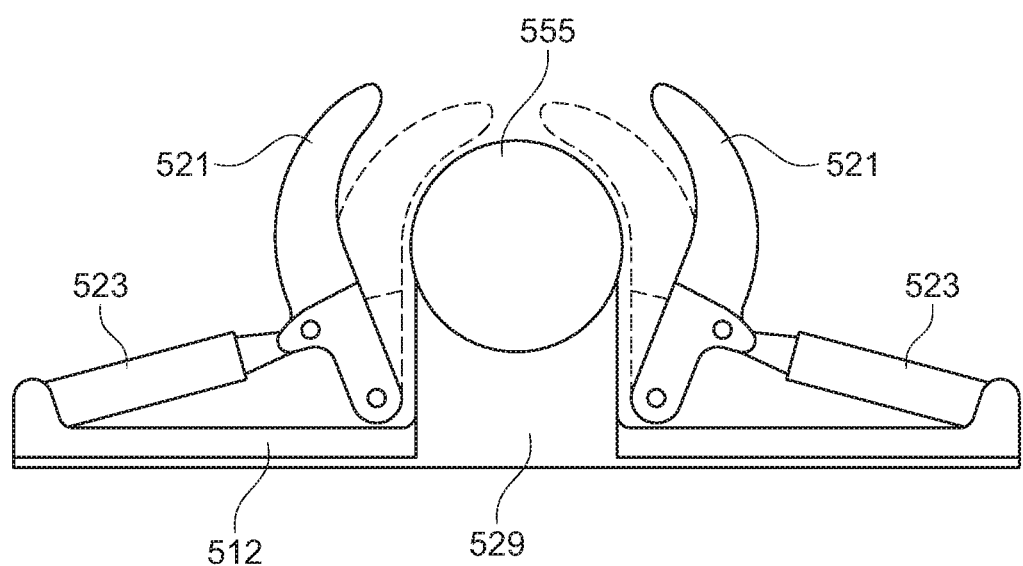
Figure 34:
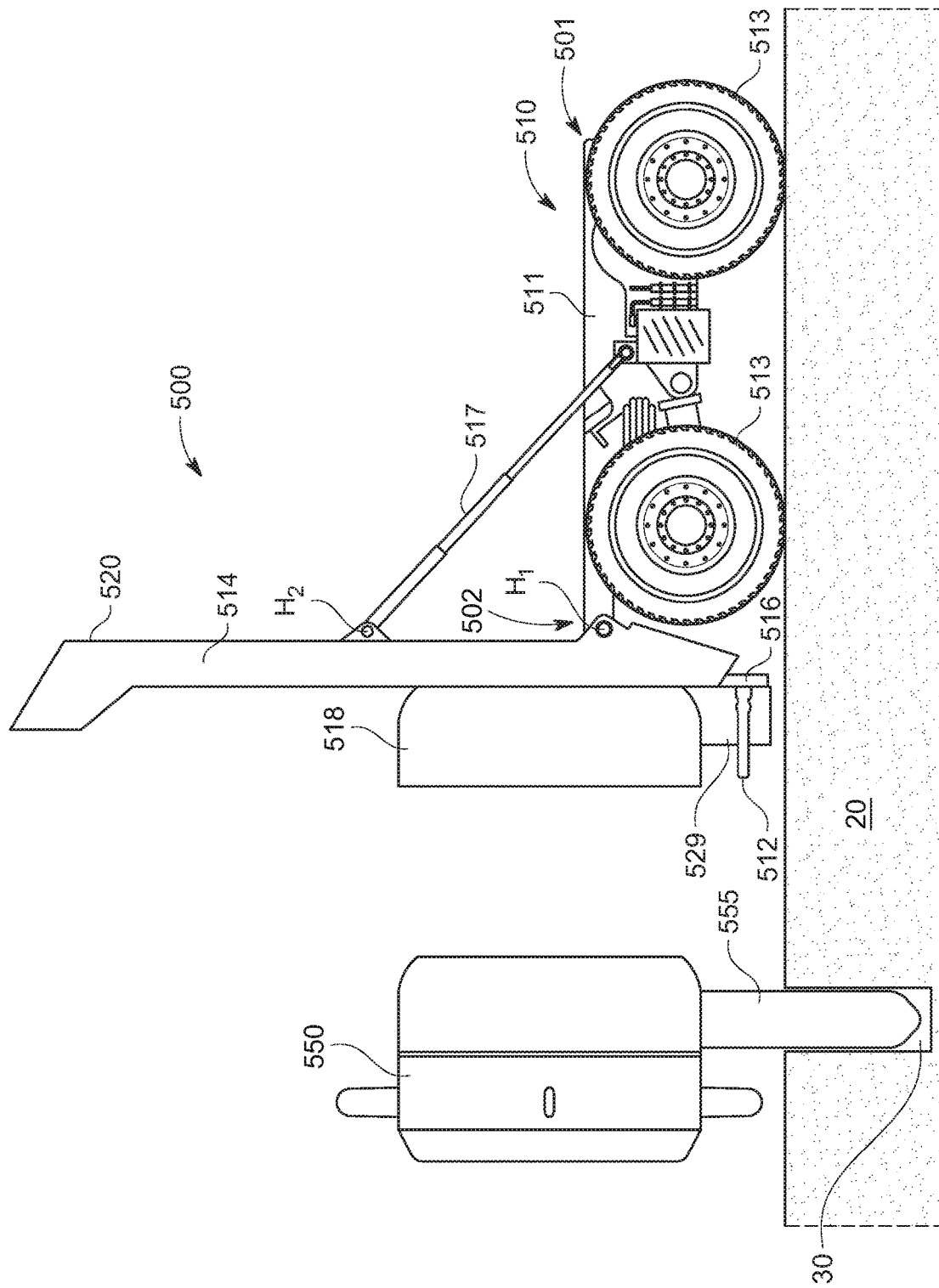

Once the anchoring spire 555 is implanted and secured within the hole 30, as illustrated sequentially in FIGS. 32-34, the gripping mechanism 512 of the mounting assembly 520 is then activated to release the hydroelectric turbine 550 from the sliding frame 516. As discussed above, the grippers 521 of the gripping mechanism 512 may open to release the anchoring spire 555 (see FIG. 33), thereby also releasing the turbine 550. The aquatic vehicle 510 may then drive forward to disengage the hydroelectric turbine 550 from the payload carriage (see FIG. 34).

Figure 35:
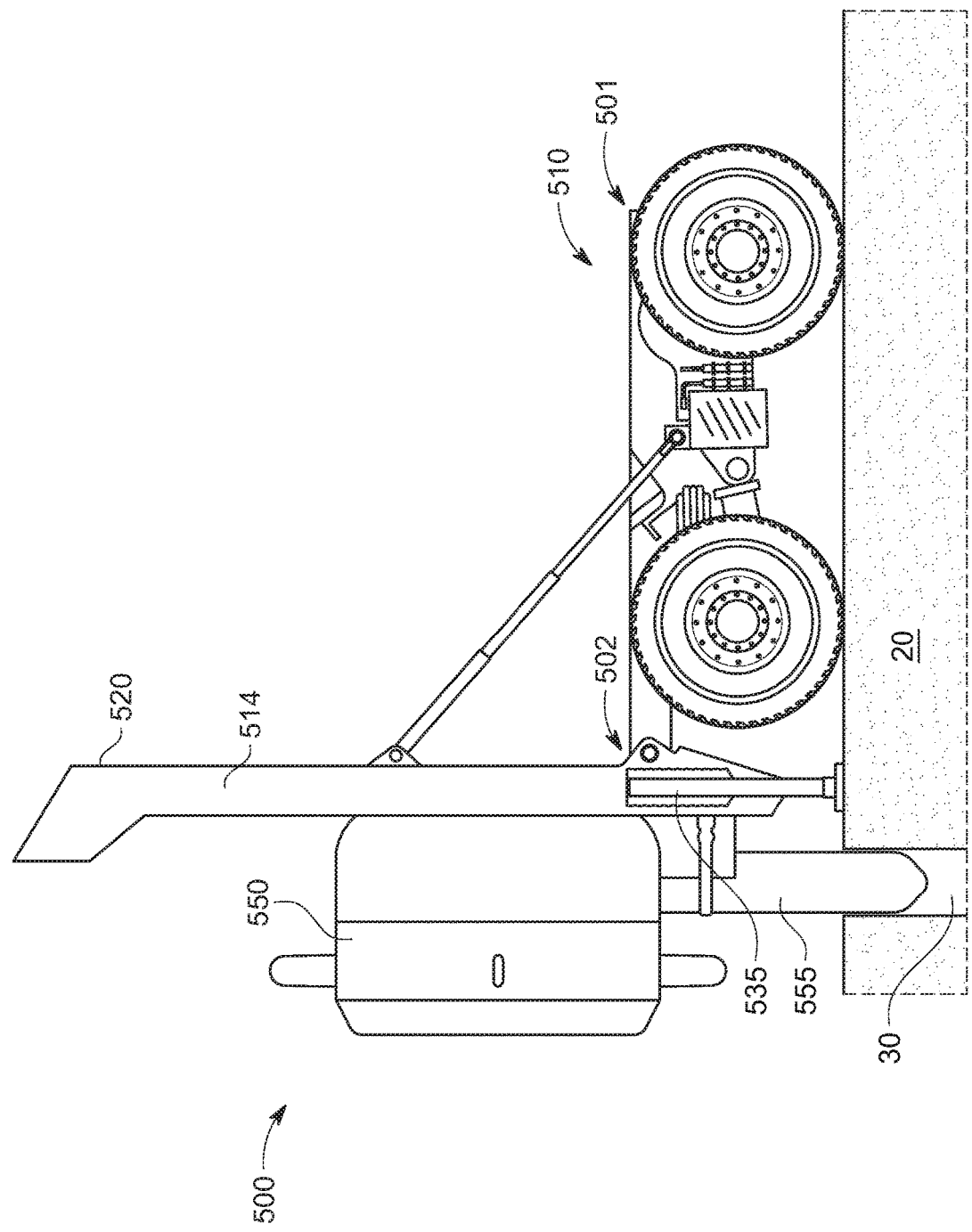
FIG. 35 shows a side view of the system for deploying hydroelectric energy systems of FIGS. 27-34 with a hydraulic leveling jack in accordance with the present disclosure.

Those of ordinary skill in the art would understand that the above deployment steps described with reference to the embodiment of system 500 and FIGS. 27-34 are exemplary only and that the methods for deploying a subaquatic payload disclosed in the present application may be carried out by various deployment systems, which are used to deploy various types of subaquatic payloads, and may employ various additional steps, which utilize various additional component parts. In various embodiments, for example, the aquatic vehicle 510 may also include an electrohydraulic system for leveling and stabilizing the vehicle 510 at the deployment site 20. As illustrated in FIG. 35, the electrohydraulic system may include leveling jacks 535 (only one jack being visible in the view of FIG. 35) positioned at each of the first and second ends 501 and 502 of the vehicle 510, for example, at each corner of the vehicle 510.

Figure 36:
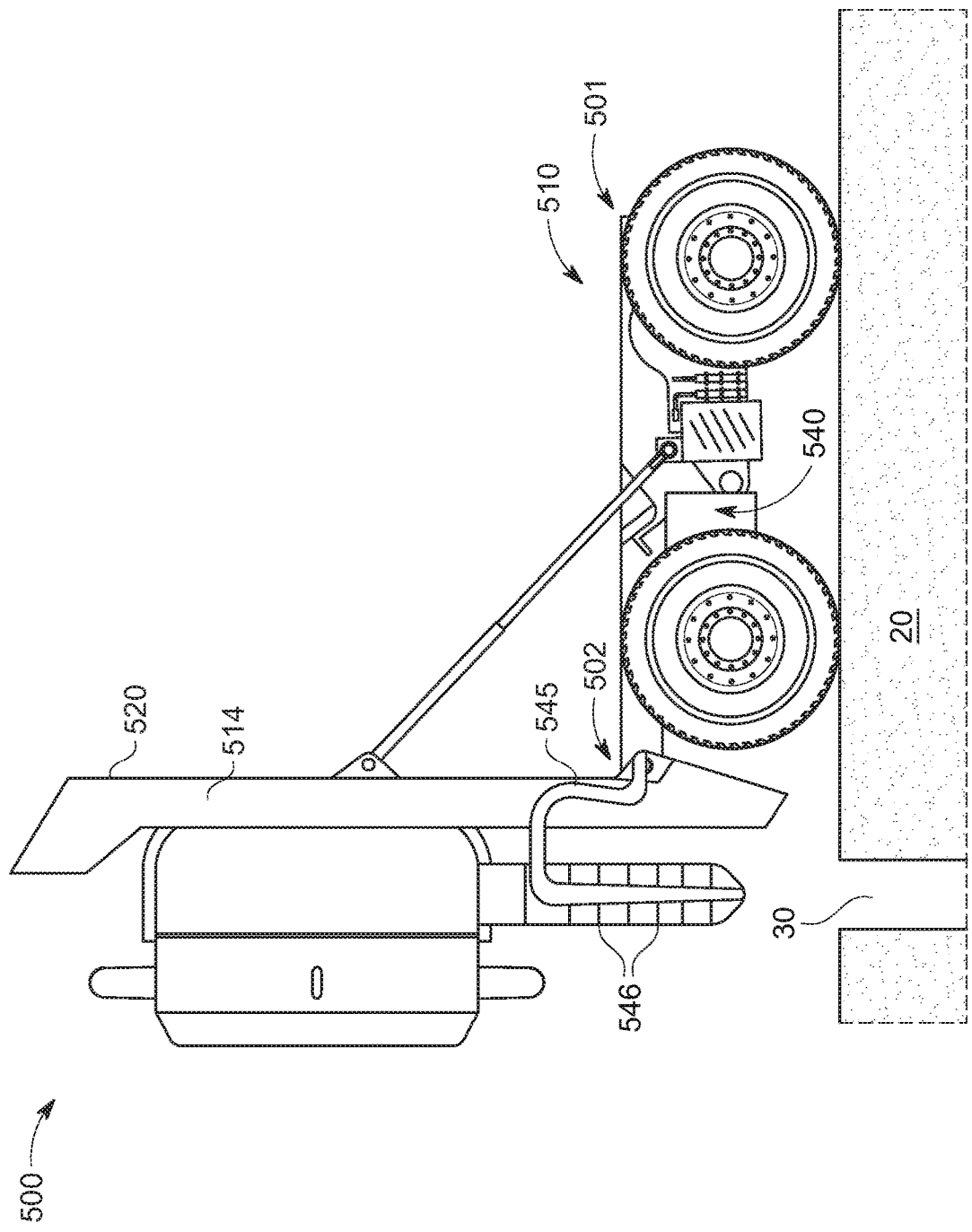
FIG. 36 shows a side view of the system for deploying hydroelectric energy systems of FIGS. 27-34 with an injection grouting system in accordance with the present disclosure.

In various additional embodiments, the vehicle 510 may further include an injection grouting system for pumping a grouting material into the hole 30 to anchor the anchoring spire 555 within the hole 30 during deployment of the turbine 550. As illustrated in FIG. 36, for example, the vehicle 510 may include an injection grouting pump 540 that is can be fluidically coupled to injection grouting ports 546 in the anchoring spire 555 via a conduit 545 running through the support 520 and anchoring spire 555.

Figure 41:
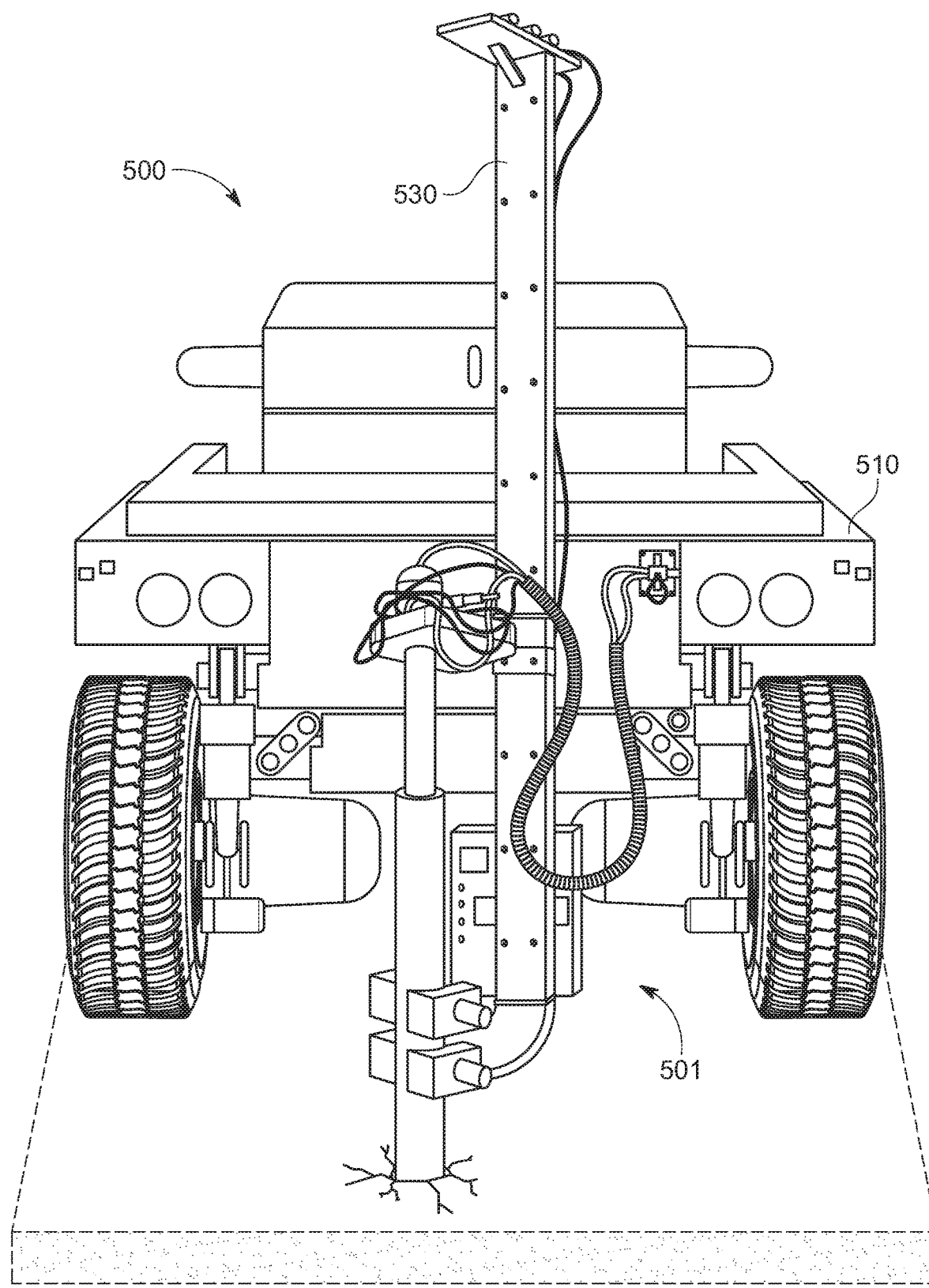
FIG. 41 shows a front view of the system for deploying hydroelectric energy systems of FIGS. 27-34 with a boring mechanism in accordance with the present disclosure.

Furthermore, although the above method of deployment discusses deploying the payload (e.g., the hydroelectric turbine 550) into a pre-drilled hole 30 (e.g., drilled prior to the arrival of the aquatic vehicle 510), as discussed above with reference to the embodiment of FIGS. 1-6, various embodiments of the present disclosure also contemplate deployment systems that include a boring mechanism, such that the vehicle 510 may also carry the boring mechanism to the deployment site 20 to drill the hole 30. As illustrated in FIG. 41, for example, a boring mechanism may be mounted to the first end (e.g., the front end) 501 of the vehicle 510 and maybe be for example, a subsea drill rig 530, as would be known by the those of ordinary skill in the art. In various embodiments, the drill rig 530 can be hard wired and/or wirelessly connected to the remote embedded controller 506 of the aquatic vehicle 510, such that the controller 506 can activate and control the boring mechanism 530. In various additional embodiments, the drill 530 can be wirelessly connected to an onshore location or watercraft (e.g., the control room 580) and be remotely activated and controlled via, for example, the remote controller 586.

It will also be understood by those of ordinary skill in the art that a complete hydroelectric energy system, which utilizes the exemplary hydroelectric turbine 150, 550 can have various additional component parts, such as, for example, transmission lines and power takeoff components, that are connected, for example, to energy grids, which are not shown and described in the present disclosure. Consequently, the system 100, 500 may be configured to connect a transmission line (not shown) of the hydroelectric turbine 150, 550 to an energy grid cable (not shown). In various embodiments, for example, an aquatic vehicle in accordance with an exemplary embodiment may include a robotic arm (not shown) to connect the transmission line to the energy grid cable and/or to perform other functions requiring multiple degree freedom of movement. Furthermore, it will be understood by those of ordinary skill in the art that the turbines of the present disclosure may be configured to operate with various and changing directions of fluid flow (as illustrated by the multi-directional arrows illustrating the fluid flow F in FIGS. 5-8), and are configured to operate with both the ebb and flow of, for example, tidal currents, as well as currents coming from only one direction, such as, for example, river currents.

Thus, as will be understood by those of ordinary skill in the art, although the present disclosure is generally described with reference to generating energy via tidal currents, the deployment systems and methods disclosed herein are applicable to deployment of turbines and hydroelectric energy systems in a wide range of fluid flow applications including, but not limited to, ocean and tidal environments, rivers, and streams, as well as fluids other than water.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be included in the second embodiment.

It is noted that, as used herein, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the disclosure. For example, spatially relative terms—such as "upstream," downstream," "beneath," "below," "lower," "above," "upper," "forward," "front," "behind," and the like—may be used to describe one element's or feature's relationship to another element or feature as illustrated in the orientation of the figures. These spatially relative terms are intended to encompass different positions and orientations of a device in use or operation in addition to the position and orientation shown in the figures. For example, if a device in the figures is inverted, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the systems and methods of the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present disclosure.

It is to be understood that the particular examples and embodiments set forth herein are non-limiting, and modifications to structure, dimensions, materials, and methodologies may be made without departing from the scope of the present disclosure. Other embodiments in accordance with the present disclosure will be apparent to those skilled in the art from consideration of the specification and practice of the invention disclosed herein. It is intended that the specification and examples be considered as exemplary only, with being entitled to their full breadth of scope, including equivalents.

What is claimed is:

1. A method for deploying a payload at a subaquatic deployment location, the method comprising:
    submersing a submersible aquatic vehicle in a body of water, the submersible aquatic vehicle carrying a payload including a hydroelectric turbine;
    driving the submersible aquatic vehicle to a deployment location under the body of water while the submersible aquatic vehicle carries the hydroelectric turbine in a first position;
    at the deployment location, moving the hydroelectric turbine from the first position to a second position; and
    deploying the hydroelectric turbine from the second position to a deployment position by removing the hydroelectric turbine from the submersible aquatic vehicle and positioning the hydroelectric turbine at the deployment location.

2. The method of claim 1, wherein submersing the submersible aquatic vehicle comprises driving the submersible aquatic vehicle into the body of water from a location on land or lowering the submersible aquatic vehicle into the body of water from a watercraft.

3. The method of claim 1, further comprising, after deploying the hydroelectric turbine, driving the submersible aquatic vehicle from the deployment location to a location on land.

4. The method of claim 1, wherein driving the submersible aquatic vehicle comprises autonomously driving the submersible aquatic vehicle.

5. The method of claim 1, further comprising:
    at the deployment location, transitioning the submersible aquatic vehicle from a first, driving configuration to a second, deployment configuration;
    while in the second, deployment configuration, activating a mounting system carrying the hydroelectric turbine payload to transition the mounting system between a first position and a second position;
    deploying the hydroelectric turbine at the deployment location; and
    after deployment of the hydroelectric turbine, transitioning the submersible aquatic vehicle from the second, deployment configuration to the first, driving configuration.

6. The method of claim 5, wherein transitioning the submersible aquatic vehicle from the first configuration to the second configuration comprises lowering a body of the submersible aquatic vehicle.

7. The method of claim 6, wherein the deployment location is a bed under the body of water and the method further comprises, while in the second, deployment configuration, stabilizing the submersible aquatic vehicle by anchoring the submersible aquatic vehicle to the bed.

8. The method of claim 1, further comprising drilling a hole at the deployment location using a drill carried by the submersible aquatic vehicle.

9. The method of claim 8, wherein the payload to be deployed at the deployment location further comprises a foundation structure, the method further comprising:
    inserting the foundation structure into the hole; and
    coupling the hydroelectric turbine on the foundation structure.

10. A system for deployment of a hydroelectric turbine at a subaquatic location, the system comprising:
    a submersible aquatic vehicle configured to drive to a deployment location at a bed under a body of water; and
    at least one payload mounting device affixed to the submersible aquatic vehicle, the payload mounting device configured to transition between a first position to carry the hydroelectric turbine to the deployment location, and a second position to orient and detach the hydroelectric turbine from the payload mounting device for deployment within the bed under the body of water at the deployment location.

11. The system of claim 10, wherein the submersible aquatic vehicle is an autonomous vehicle.

12. The system of claim 10, wherein the submersible aquatic vehicle has an aerodynamic outer surface profile.

13. The system of claim 10, wherein the submersible aquatic vehicle further comprises a lift mechanism, the lift mechanism being configured to raise and lower the submersible aquatic vehicle to transition the submersible aquatic vehicle between a first, driving configuration and a second, deployment configuration.

14. The system of claim 13, wherein the lift mechanism comprises a plurality of wheels, the plurality of wheels being transitionable between a deployed position to provide rolling contact on a support surface and a retracted position into a body of the submersible aquatic vehicle.

15. The system of claim 13, further comprising an anchoring mechanism deployable in the second configuration of the submersible aquatic vehicle to stabilize the submersible aquatic vehicle relative to the deployment location.

16. The system of claim 10, wherein the hydroelectric turbine comprises an anchoring spire to anchor the hydroelectric turbine in a hole within the bed under the body of water at the deployment location.

17. The system of claim 16, wherein:
    in the first position of the payload mounting device, the payload mounting device holds the hydroelectric turbine such that a longitudinal axis of the anchoring spire is generally parallel to a surface of the bed the hole is in, and
    in the second position of the payload mounting device, the payload mounting device holds the hydroelectric turbine such that a longitudinal axis of the anchoring spire is generally perpendicular to the bed the hole is in and oriented to be received in the hole.

18. The system of claim 17, wherein the at least one payload mounting device comprises:
a lifting frame;
a sliding frame configured to slide in and out of the lifting frame; and
a payload carriage affixed to the sliding frame, the payload carriage being configured to carry the hydroelectric turbine.

19. The system of claim 18, wherein the at least one payload mounting device further comprises a gripping mechanism configured to releasably grip the anchoring spire.

20. The system of claim 18, wherein the at least one payload mounting device further comprises a lubricating liner or coating positioned to reduce friction between surfaces of the lifting frame and the sliding frame.

21. The system of claim 20, wherein the lubricating liner or coating comprises Vesconite.

22. The system of claim 18, further comprising a first telescoping hydraulic lift mechanism pivotably coupled to the lifting frame, the first telescoping hydraulic lift mechanism being configured to pivot the lifting frame to transition the lifting frame between a first horizontal position, wherein the lifting frame is parallel to the longitudinal axis, and a second vertical position, wherein the lifting frame is perpendicular to the longitudinal axis.

23. The system of claim 22, further comprising a second telescoping hydraulic lift mechanism extending between the lifting frame and the sliding frame, the second telescoping hydraulic lift mechanism being configured to slide the sliding frame relative to the lifting frame to transition the sliding frame between a first vertical position and a second vertical position.

24. The system of claim 10, wherein the submersible aquatic vehicle comprises continuous tracks to move the submersible aquatic vehicle.

25. The system of claim 10, wherein the at least one payload mounting device comprises a wheeled cart movably secured to a track, the track being moveable from a position parallel to the bed in the first position of the payload mounting device to a second position perpendicular to the bed in the second position of the payload mounting device.

* * * * *

UNITED STATES PATENT AND TRADEMARK OFFICE
CERTIFICATE OF CORRECTION

| | | |
|---|---|---|
| PATENT NO. | : 12,037,093 B2 | Page 1 of 1 |
| APPLICATION NO. | : 17/617404 | |
| DATED | : July 16, 2024 | |
| INVENTOR(S) | : Daniel E. Power, III | |

It is certified that error appears in the above-identified patent and that said Letters Patent is hereby corrected as shown below:

In the Claims

In Column 21, Claim 5, Line 64, delete "payload".

Signed and Sealed this
Twenty-ninth Day of October, 2024

*Katherine Kelly Vidal*

Katherine Kelly Vidal
*Director of the United States Patent and Trademark Office*